(12) United States Patent
Toriumi

(10) Patent No.: US 12,276,145 B2
(45) Date of Patent: Apr. 15, 2025

(54) LOCK DEVICE FOR OPENING AND CLOSING BODY

(71) Applicant: PIOLAX, INC., Kanagawa (JP)

(72) Inventor: Katsuya Toriumi, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 131 days.

(21) Appl. No.: 18/022,421

(22) PCT Filed: Aug. 27, 2021

(86) PCT No.: PCT/JP2021/031442
§ 371 (c)(1),
(2) Date: Feb. 21, 2023

(87) PCT Pub. No.: WO2022/050178
PCT Pub. Date: Mar. 10, 2022

(65) Prior Publication Data
US 2024/0044189 A1 Feb. 8, 2024

(30) Foreign Application Priority Data

Sep. 3, 2020 (JP) ................................ 2020-148303

(51) Int. Cl.
*E05C 9/04* (2006.01)
*E05B 81/06* (2014.01)
(Continued)

(52) U.S. Cl.
CPC ............... *E05C 9/04* (2013.01); *E05B 81/06* (2013.01); *E05B 81/18* (2013.01); *E05B 81/30* (2013.01); *E05B 81/34* (2013.01); *E05B 83/30* (2013.01)

(58) Field of Classification Search
CPC . E05C 9/04; E05C 9/043; E05C 9/041; E05B 81/06; E05B 81/18; E05B 81/30;
(Continued)

(56) References Cited

U.S. PATENT DOCUMENTS

2007/0080542 A1 4/2007 Ookawara
2014/0150505 A1 6/2014 Shimizu
(Continued)

FOREIGN PATENT DOCUMENTS

DE 2923447 A1 * 12/1980 ............. E05B 81/25
DE 3738416 A1 * 5/1989 ............. E05B 81/25
(Continued)

OTHER PUBLICATIONS

Sep. 28, 2021, International Search Report issued for related PCT Application No. PCT/JP2021/031442.
(Continued)

*Primary Examiner* — Kristina R Fulton
*Assistant Examiner* — Steven A Tullia
(74) *Attorney, Agent, or Firm* — Paratus Law Group, PLLC

(57) ABSTRACT

There is provided a lock device for an opening and closing body, including: a locking portion; a locking member; a case including a first case and a second case; a rotation body; and a biasing means. A cut-out is provided, and a retaining portion is provided, the retaining portion including a protruding portion and being configured to retain the rotation body relative to the first case. A first engaging surface and a second engaging surface are configured to engage with each other to form a temporary locking portion for temporarily locking the rotation body. A cam means and a stopper are provided between the second case and the rotation body, the stopper being configured to engage with the rotation body so as to hold the rotation body with the first engagement surface and the second engaging surface disengaged from each other.

4 Claims, 26 Drawing Sheets

(51) Int. Cl.
*E05B 81/18* (2014.01)
*E05B 81/30* (2014.01)
*E05B 81/34* (2014.01)
*E05B 83/30* (2014.01)

(58) Field of Classification Search
CPC . E05B 81/34; E05B 83/30; B60R 7/06; Y10T 292/0837; Y10T 292/084; Y10T 292/0839
See application file for complete search history.

(56) References Cited

U.S. PATENT DOCUMENTS

| | | | |
|---|---|---|---|
| 2015/0252593 A1* | 9/2015 | Milne | E05B 81/25 174/541 |
| 2018/0371795 A1 | 12/2018 | Nakasone | |

FOREIGN PATENT DOCUMENTS

| | | | | |
|---|---|---|---|---|
| JP | 3079611 B2 * | 8/2000 | | E05B 79/20 |
| JP | 2007-100343 A | 4/2007 | | |
| WO | WO 2013/018496 A1 | 2/2013 | | |
| WO | WO 2016/185973 A1 | 11/2016 | | |

OTHER PUBLICATIONS

Sep. 28, 2021, International Search Opinion issued for related PCT Application No. PCT/JP2021/031442.

* cited by examiner

LOCK DEVICE FOR OPENING AND CLOSING BODY

CROSS REFERENCE TO PRIOR APPLICATION

This application is a National Stage Patent Application of PCT International Patent Application No. PCT/JP2021/031442 (filed on Aug. 27, 2021) under 35 U.S.C. § 371, which claims priority to Japanese Patent Application No. 2020-148303 (filed on Sep. 3, 2020), which are all hereby incorporated by reference in their entirety.

TECHNICAL FIELD

The present invention relates to a lock device for an opening and closing body, for locking the opening and closing body which is attached to an opening portion in a fixed body in such a manner as to be opened and closed in a closed state.

BACKGROUND ART

For example, an opening and closing body such as a lid or the like is attached to an opening portion formed in a fixed body such as a glove box of a motor vehicle in such a manner as to be opened and closed. Then, a lock device is provided between the opening portion and the opening and closing body not only to lock the opening and closing body in a closed state when the opening and closing body is closed but also to release the locking of the opening and closing body when the opening and closing body is opened.

For example, Patent Literature 1 below describes a side lock device including a retainer attached to a lid, a rotor pivotally supported on a rear side of the retainer, a pair of rods which engage with the rotor at proximal end portions thereof and which are supported in such a manner that distal end portions thereof can appear from and disappear into both sides of the lid, a knob attached to a front side of the retainer, and a return spring attached to the rotor and rotationally biasing the rotor at all times in a direction where the rods protrude from both the sides of the lid. The rotor is caused to rotate against the return spring through a pushing or pulling operation of the knob to thereby allow the rods to be pulled into the lid.

In addition, a rotation restriction claw is formed via a U-shaped slit on the rear side of the retainer. Further, an arc-shaped groove portion and a recessed portion, which is formed a predetermined distance away from the arc-shaped groove portion, are provided on a rear side of the rotor. When the retainer is assembled to the rotor, the rotation restriction claw on the rear side of the retainer is inserted into the recessed portion on the rear side of the rotor, whereby the rotor is held temporarily, and when the rotor is caused to rotate in that state, the rotation restriction claw rides over the recessed portion, resulting in a state in which the rotation restriction claw enters the arc-shaped groove portion, whereby the rotor is pivotally supported so as to be rotatable.

In addition, the rotor, which is rotationally biased by the return spring, is configured to be restricted from rotation by an engaging surface provided on a distal end side of the rotation restriction claw on the rear side of the retainer being brought into engagement with a circumferential end portion of the arc-shaped groove portion on the rear side of the rotor (a wall portion between the arc-shaped groove portion and the recessed portion).

CITATION LIST

Patent Literature

Patent Literature 1: JP2007-100343A

SUMMARY OF INVENTION

Technical Problem

In the side lock device of Patent Literature 1 described above, since the rotor is restricted from rotation by bringing the engaging surface at the distal end side of the rotation restriction claw into abutment with the circumferential end portion of the arc-shaped groove portion on the rear side of the rotor, the engaging surface provided at the distal end side of the rotation restriction claw needs to be formed large to some extent. However, it is difficult to secure such an engaging surface on the rotation restriction claw because the rotation restriction claw has to ride over the recessed portion, resulting in a possibility that the rotor cannot be restricted from rotation sufficiently.

Consequently, an object of the present invention is to provide a lock device for an opening and closing body which can securely restrict a rotation of a rotation body.

Solution to Problem

With a view to attaining the object, according to the present invention, there is provided a lock device for an opening and closing body to be attached to an opening portion in a fixed body in such a manner as to be opened and closed, including: a locking portion to be provided on one of the fixed body or the opening and closing body; a locking member to be disposed on other of the fixed body or the opening and closing body and configured to engage with and disengage from the locking portion; a case including a first case and a second case configured to be assembled to the first case, and configured to be attached to the fixed body or the opening and closing body; a rotation body pivotally supported on the case so as to be rotatable; and a biasing means configured to rotationally bias the rotation body in a first direction. A pivot is provided on one of the first case or the rotation body, and a support hole through which the pivot is passed is provided in other of the first case or the rotation body. A cut-out is provided in a circumferential edge of the support hole, and a retaining portion is provided on the pivot, the retaining portion including a protruding portion configured to pass through the cut-out and being configured to retain the rotation body relative to the first case by causing the protruding portion to pass through the cut-out and thereafter causing the rotation body to rotate in a second direction which is opposite to the first direction. A first engaging surface and a second engaging surface are formed between the first case and the rotation body in such a manner as to engage with or disengage from each other in association with a rotation of the rotation body. The first engaging surface and the second engaging surface are configured to engage with each other to form a temporary locking portion for temporarily locking the rotation body relative to the first case by restricting the rotation body from rotating in the first direction. A cam means and a stopper are provided between the second case and the rotation body, the cam means being configured to cause the rotation body to rotate by a predetermined angle in the second direction so as to cause the first engaging surface and the second engaging surface, which are in an engaged state, to disengage from each other when the second case is assembled to the first case, the stopper being configured to engage with the rotation body after the rotation body is caused to rotate by the cam means so as to hold the rotation body relative to the first case with the first engagement surface and the second engaging surface disengaged from each other.

Advantageous Effects of Invention

According to the present invention, the pivot is inserted into the support hole with the protruding portion aligned with the cut-out, and the rotation body is caused to rotate in the second direction which is opposite to the first direction after the protruding portion has been passed through the cut-out, whereby not only is the rotation body retained and held relative to the first case by the retaining portion, but also both the engaging surfaces of the temporary locking portion are brought into engagement with each other to restrict the rotation body from rotating in the first direction, whereby the rotation body is temporarily locked on the first case. Then, when the second case is assembled to the first case in this state, the cam means causes the rotation body to rotate, the stopper is brought into engagement with the rotation body, whereby the rotation body is held relative to the first case with the first engaging surface and the second engaging surface left disengaged from each other, thereby making it possible for the rotation body to be securely restricted from rotation.

BRIEF DESCRIPTION OF DRAWINGS

FIGS. 1A and 1B show an embodiment of a lock device for an opening and closing body according to the present invention, in which FIG. 1A is a perspective view of a state in which an opening and closing body is closed, and FIG. 1B is a perspective view of a state in which the opening and closing body is opened.

FIGS. 7A and 7B show a rotation body constituting the same lock device, in which FIG. 7A is a perspective view thereof, and FIG. 7B is a perspective view of the rotation body as viewed from a different direction from a direction in which the rotation body is viewed in FIG. 7A.

FIGS. 8A and 8B show an elastic member constituting the same lock device, in which FIG. 8A is a perspective view thereof, and FIG. 8B is a plan view thereof.

FIGS. 13A and 13B show a relationship between a second case and an elastic member constituting a stopper in the same lock device, in which FIG. 13A is a front view of a state in which a support portion is not caused to support the elastic member, and FIG. 13B is an explanatory front view of a state in which the support portion is caused to support the elastic member.

DESCRIPTION OF EMBODIMENTS

One Embodiment of Lock Device for Opening and Closing Body

Hereinafter, referring to drawings, an embodiment of a lock device for an opening and closing body according to the present invention will be described.

Figure 22:
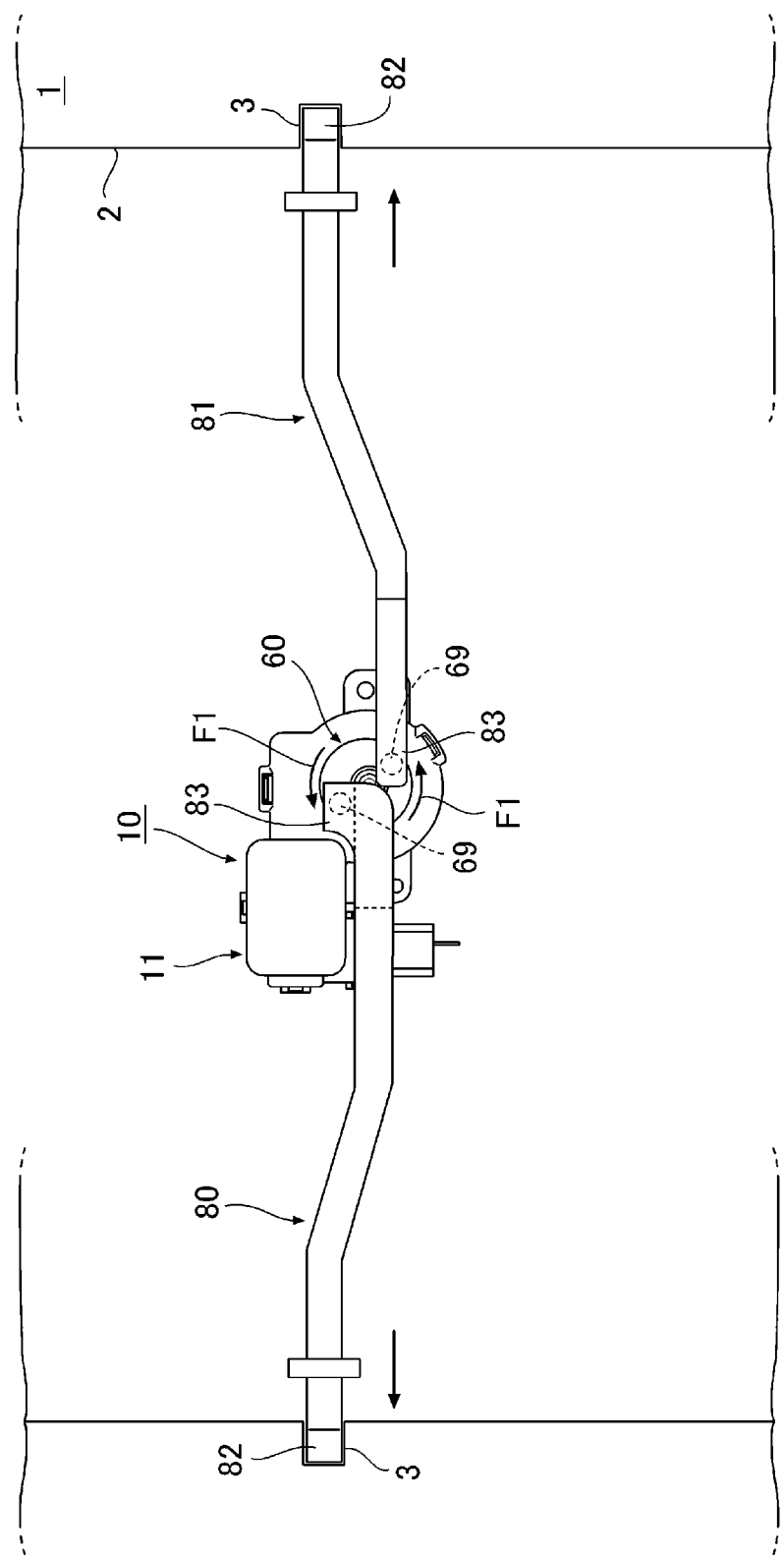
FIG. 22 is an explanatory view of a state in which an opening and closing body is closed by the same lock device.
Figure 23:
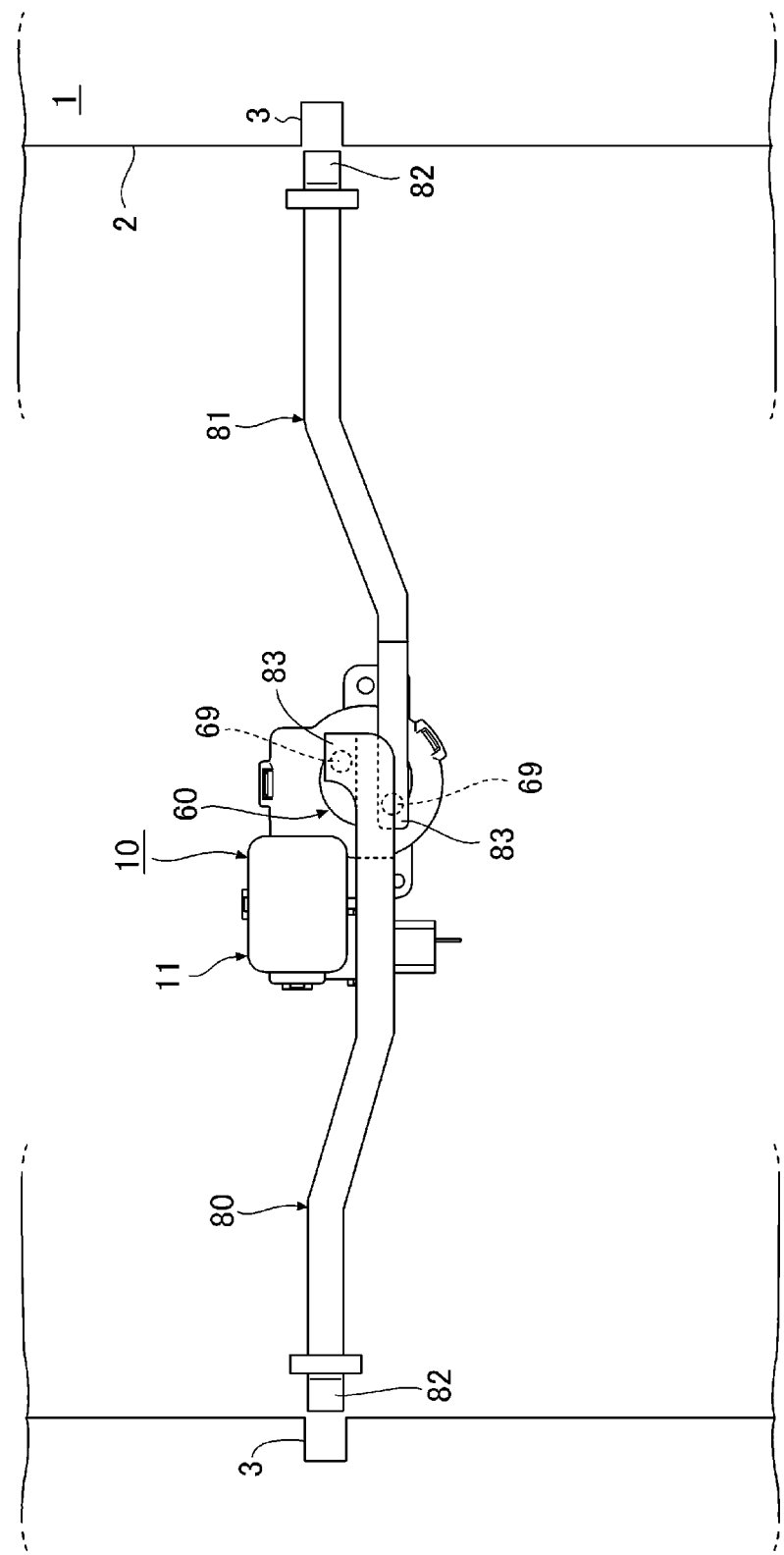
FIG. 23 is an explanatory view of a state in which the opening and closing body is opened by the same lock device.

As shown in FIGS. 22 and 23, a lock device 10 for an opening and closing body (hereinafter, also referred to simply as a "lock device 10") according to the present embodiment is such as to be used to lock, for example, an opening and closing body 5 such as a glove box or the like, which is attached to an opening portion 2 in a fixed body 1 such as an instrument panel or the like of a motor vehicle in such a manner as to be opened and closed, in a closed state. In particular, the lock device 10 of the present embodiment is configured to open the opening and closing body 5 which is locked in the closed state relative to the opening portion 2 in the fixed body 1 using electric power by a motor 13 or the like. However, as a lock device for an opening and closing body, the lock device 10 may be applied not only to a structure for opening an opening and closing body using electric power but also to a structure for mechanically opening an opening and closing body using a human force of an operator.

Referring to FIGS. 1A to 3 together, the lock device 10 of this embodiment mainly includes a pair of locking portions 3, 3 which is provided at the opening portion 2 in the fixed body 1, a case 11 configured by a first case 20 and a second case 40 which is assembled to the first case 20 and attached to the opening and closing body 5, a rotation body 60 pivotally supported on the case 11 so as to be rotatable, a torsion spring 12 configured to rotationally bias the rotation body 60 in a first direction (refer to an arrow F1 in FIG. 22), a pair of locking members 80, 81 configured to slide in association with a rotation of the rotation body 60 so as to engage with or disengage from the locking portions 3, 3, respectively, and an elastic member 90 having a base portion 91 and a stopper portion 92.

The torsion spring 12 constitutes a "biasing means" of the present invention. This torsion spring 12 includes a winding portion 12a configured by winding a wire material, a first arm portion 12b protruding inwards from a circumferential end of the winding portion 12a, and a second arm portion 12c protruding inwards from the other circumferential end of the winding portion 12a.

Figure 10:
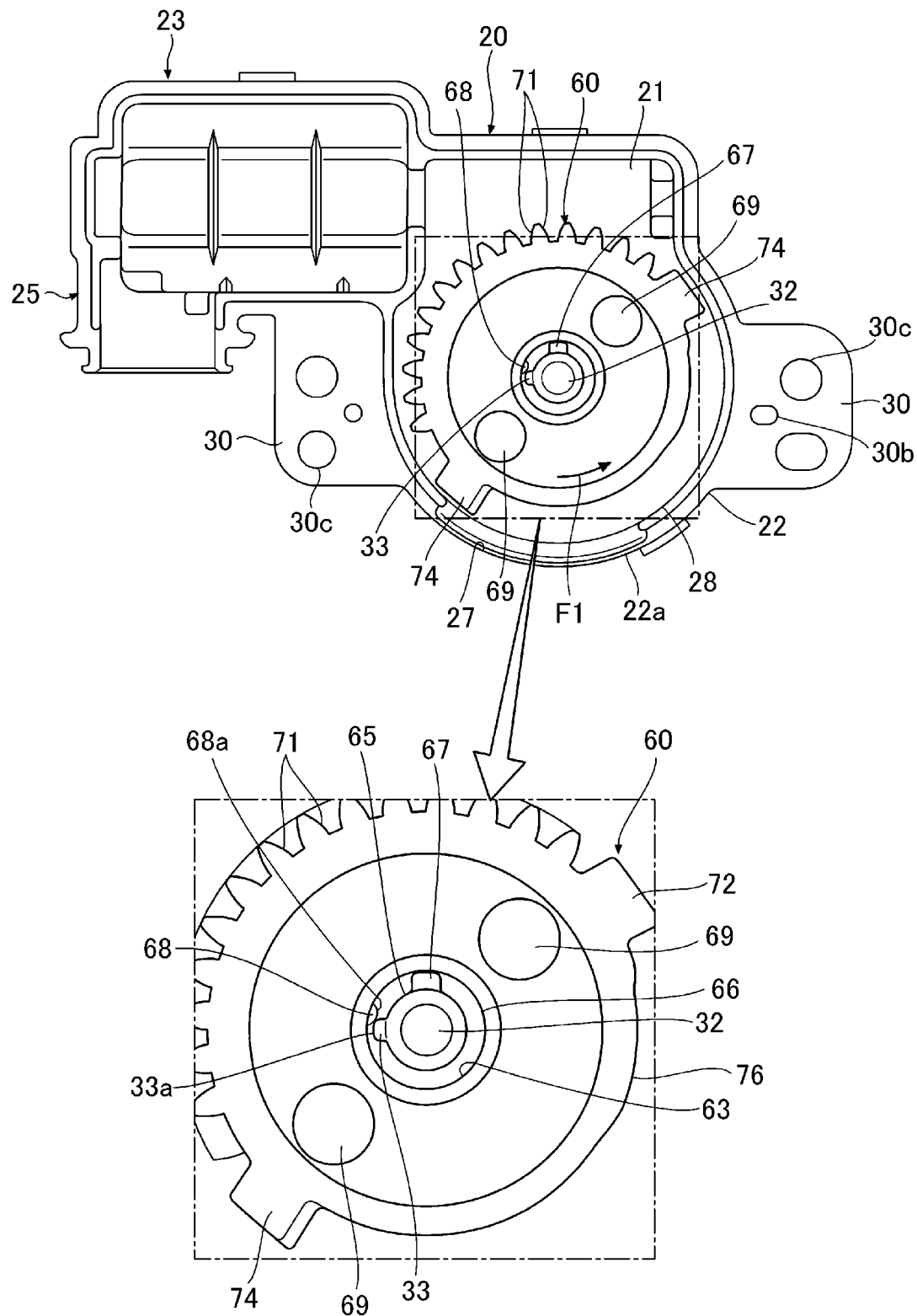
FIG. 10 is an explanatory plan view showing a state in which the rotation body is temporarily locked relative to the first case from the state shown in FIG. 9.
Figure 19:
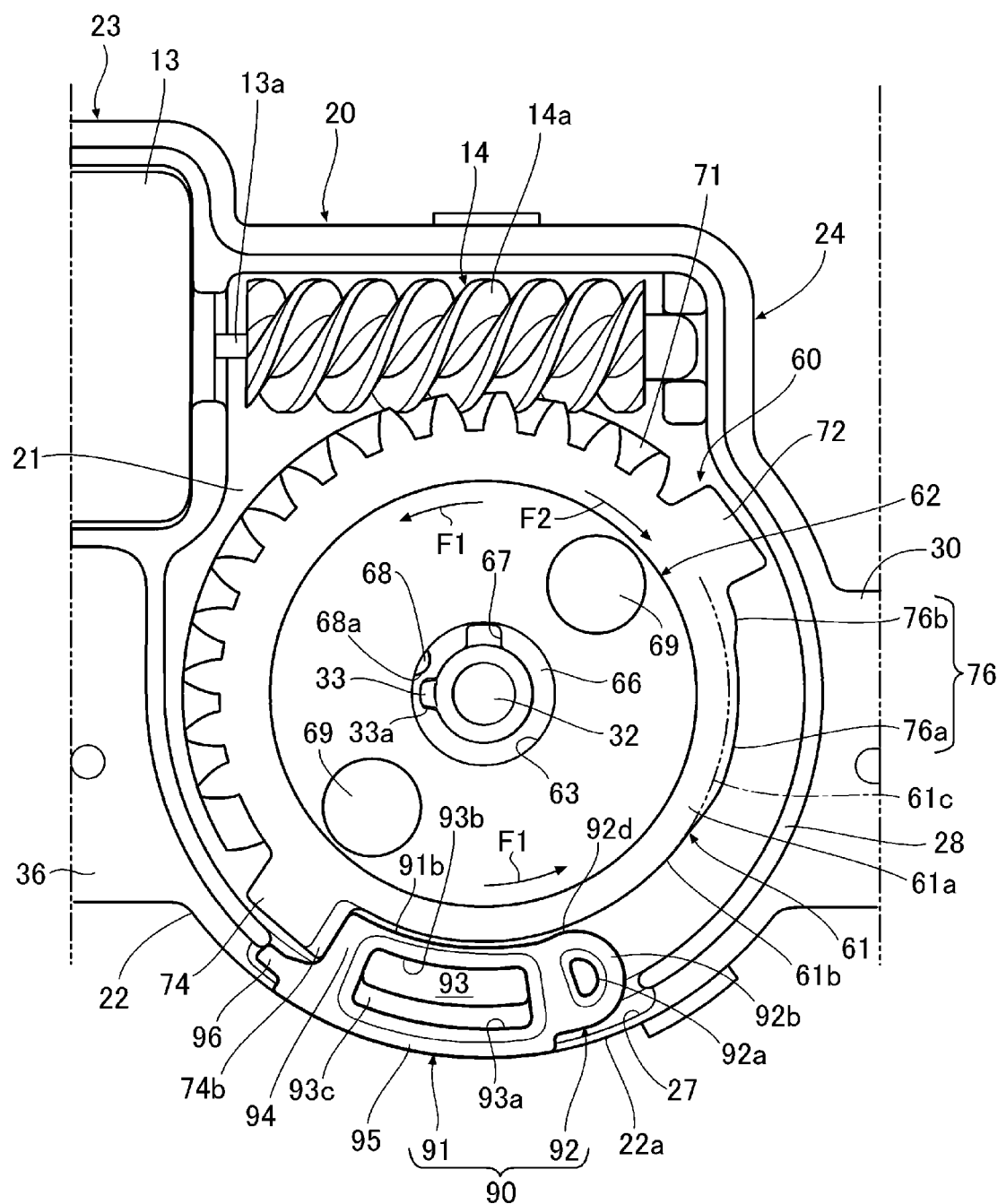
FIG. 19 is an explanatory view showing a function and effect of the same lock device, which is an explanatory plan view of a state in which the rotation body remains stationary.

Here, the "first direction" described above means a rotational biasing direction in which the rotation body 60 is rotationally biased by the torsion spring 12 constituting the biasing means as indicated by an arrow F1 in FIGS. 10, 19, and 22.

Additionally, this lock device 10 includes a motor 13 having a rotational shaft 13a, and a worm 14, having teeth 14a formed on an outer circumference thereof, is coupled to the rotational shaft 13a. This motor 13 rotates the worm 14 via the rotational shaft 13a, causing the rotation body 60 to rotate in an opposite direction to the rotational biasing direction of the torsion spring 12.

The case 11 is configured to accommodate therein the rotation body 60, the elastic member 90, and the motor 13.

The lock device for the opening and closing body may be applied, as described above, for example, to a structure in which a box-shaped glove box is attached rotatably to an opening portion in an instrument panel (in this case, the instrument panel constitutes a "fixed body" and the glove box constitutes an "opening and closing body"), or to a structure in which a lid is attached to an opening portion in an instrument panel in such a manner as to be opened and closed (in this case, the instrument panel constitutes a "fixed body", and the lid constitutes an "opening and closing body"). Thus, the lock device for the opening and closing body can widely be used for various types of opening and closing bodies configured to open and close an opening portion in a fixed body.

Further, as shown in FIGS. 22 and 23, in this embodiment, a pair of hole-shaped locking portions 3, 3 is provided at both sides of the opening portion 2 in the fixed body 1 in a width direction. The locking portions do not necessarily have to be formed into the hole shape but may be formed into a recessed shape, a protruding shape, a frame shape, or the like. In addition, the locking portions do not necessarily have to be provided on the fixed body but may be provided on the opening and closing body. Thus, there is imposed no limitation to where to provide the locking portions.

Figure 1A:
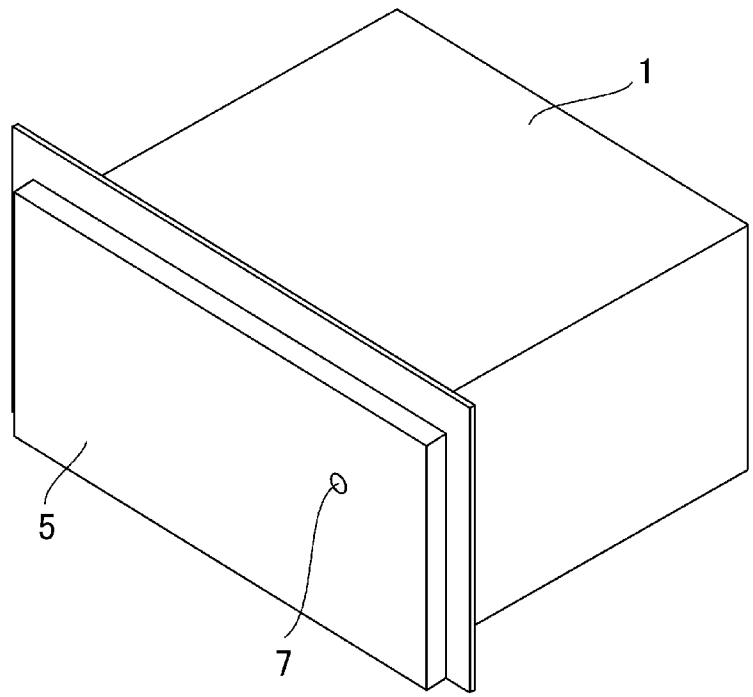

Further, as shown in FIG. 1A, a switch 7 (a touch switch, a push button type or lever type switch, or the like) for activating the motor 13 is provided in a predetermined position on a front surface side of the openable closing body 5.

The motor 13 is electrically connected to a power supply connector, not shown, via a pair of busbars 17, 17, and the rotational shaft 13a thereof is configured to rotate through operation of the switch 7.

Figure 1B:
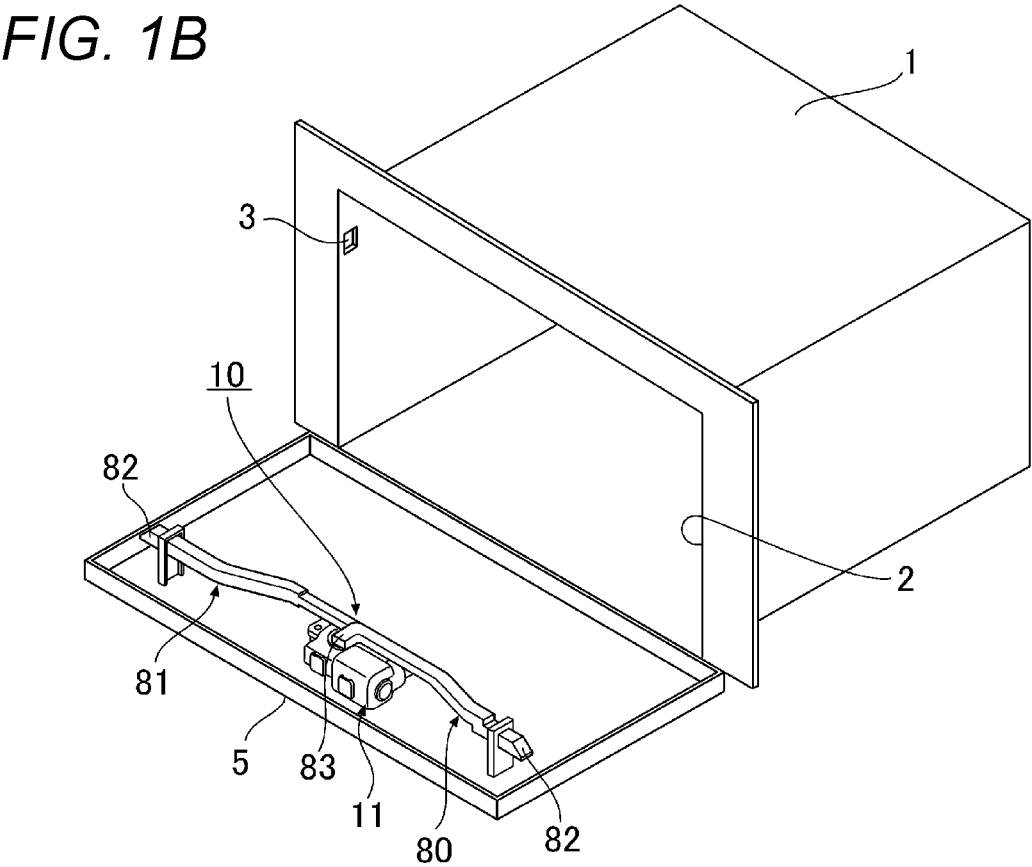

As shown in FIG. 1B, locking members 80, 81 each have a rod shape, and a bent portion is provided thereon somewhere along an axial direction, and an engaging portion 82 including a tapered surface provided at an axial distal end portion of each of the locking members 80, 81, so that these engaging portions 82, 82 are configured to engage with and disengage from the pair of locking portions 3, 3. The engaging portion 82 does not necessarily have to be provided at the distal end portion of each of the locking members 80, 81 but may be provided somewhere thereon along the axial direction.

In this embodiment, the locking members 80, 81 are disposed on the opening and closing body 5 in such a manner as to slide thereover, and the locking portions 3 are formed in the opening portion 2 in the fixed body 1, however, on the contrary to this, a configuration may be adopted in which the locking members are disposed on the fixed body in such a manner as to slide thereover, while the locking portions are provided in the opening and closing body.

Further, as shown in FIG. 22, the locking members 80, 81 are pivotally supported on the rotation body 60 at proximal end portions 83, 83 thereof, whereby the engaging portions 82 at the distal end sides of the locking members 80, 81 are configured to be biased in an engaging direction via the rotation body 60 which is rotationally biased by the torsion spring 12.

Next, the first case 20 constituting the case 11 will be described in detail.

Figure 2:
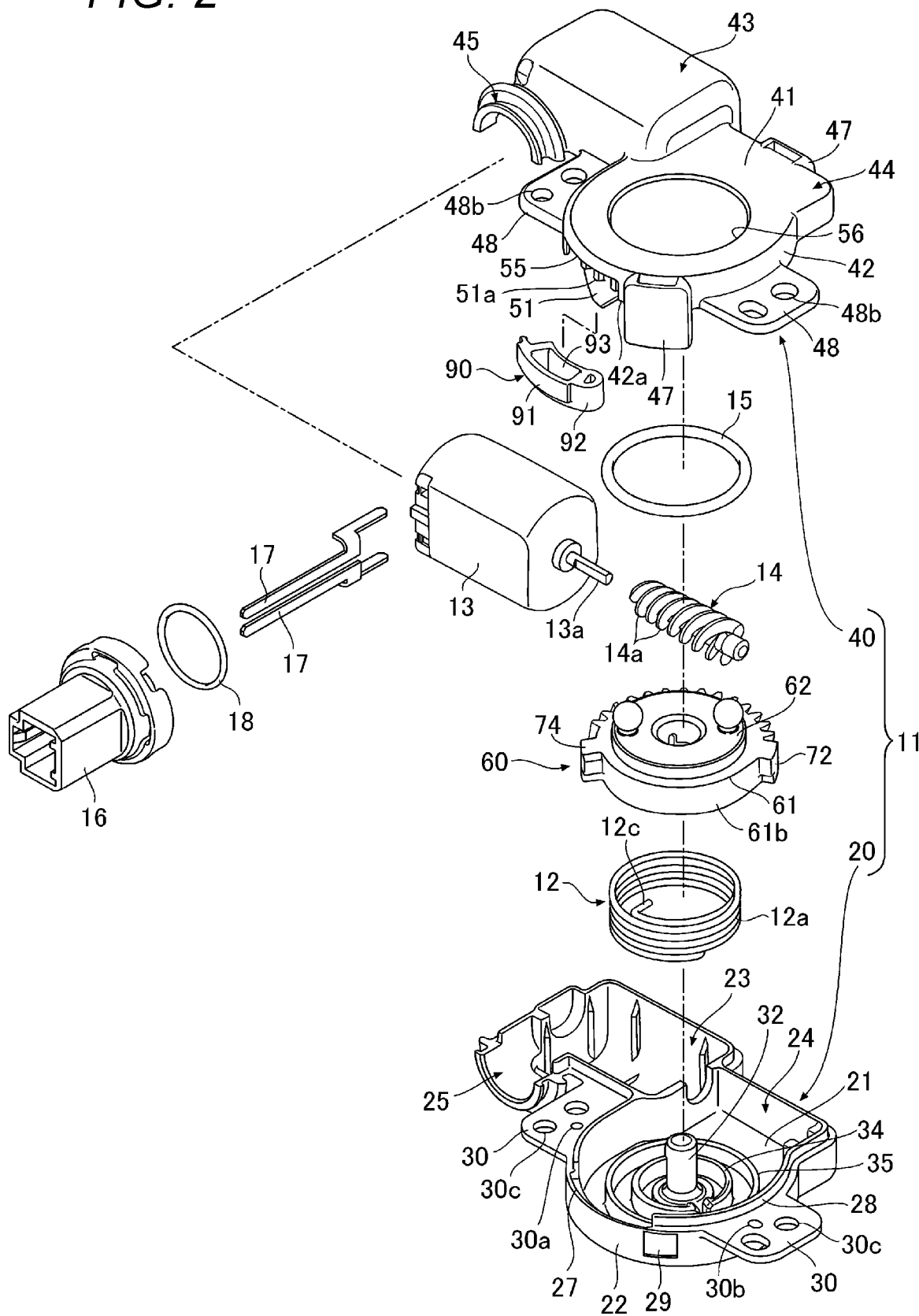
FIG. 2 is an exploded perspective view of the same lock device.

In this lock device 10, a pivot is provided on either the first case 20 or the rotation body 60, and a support hole, through which the pivot is passed, is provided in the other of either the first case 20 or the rotation body 60. As shown in FIG. 2, in this embodiment, a pivot 32 is provided on the first case 20, and a support hole 65 (refer to FIG. 3) is provided in the rotation body 60. Details of this configuration will be described later.

Figure 9:
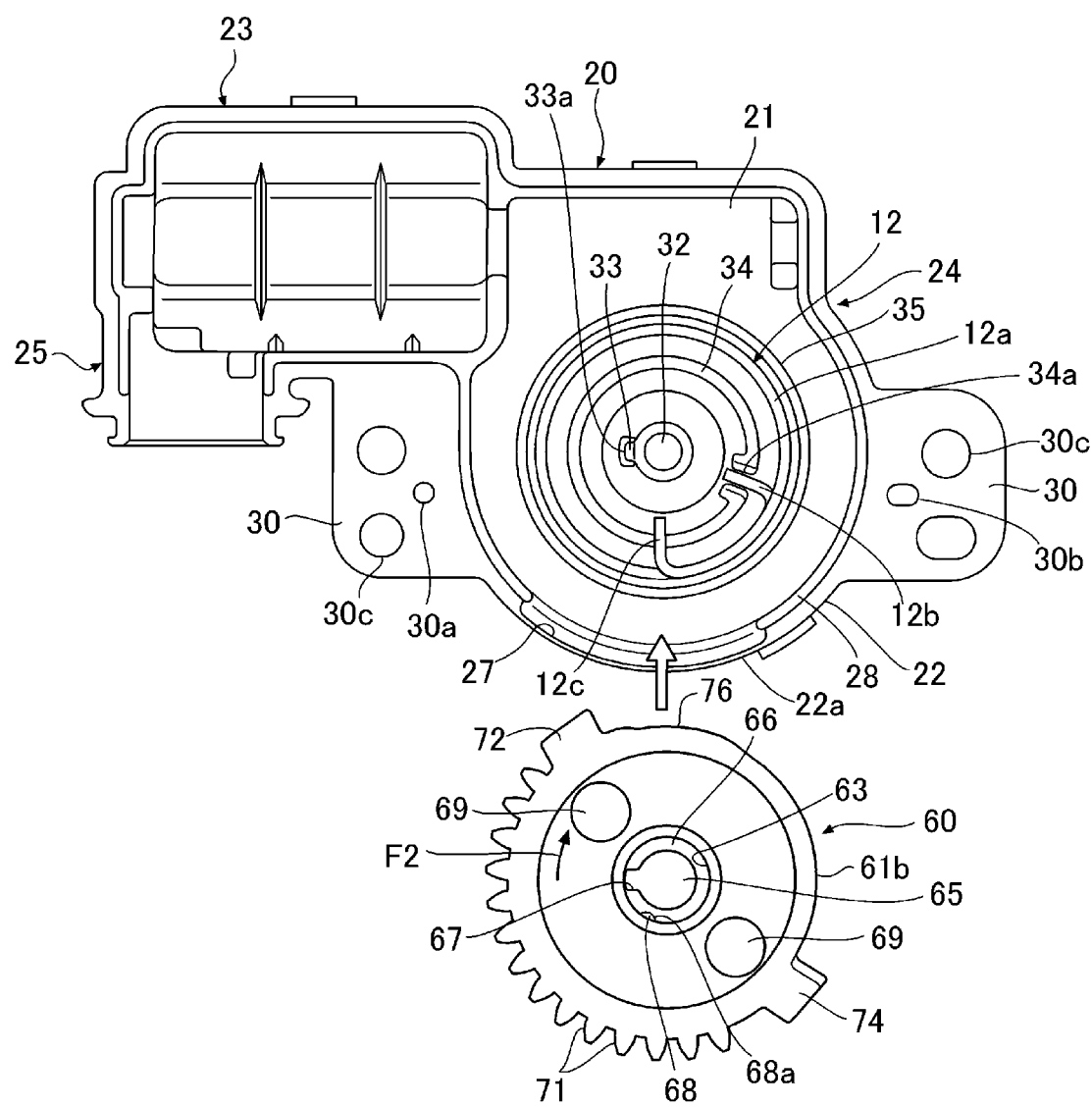
FIG. 9 is an explanatory plan view showing a relationship between the first case and the rotation body in the same lock device.

Further, as shown in FIG. 9, a cut-out 67 is provided in a circumferential edge of the support hole 65, and the pivot 32 is provided with a protruding portion (in this embodiment, a first protruding portion 33) configured to pass through the cut-out 67 and a retaining portion configured to retain the rotation body 60 relative to the first case 20 by causing the first protruding portion 33 to pass through the cut-out 67 and thereafter causing the rotation body 60 to rotate in a second direction (refer to an arrow F2) which is opposite to the first direction. In this embodiment, the cut-out 67 is provided in the rotation body 60, and the first protruding portion 33, which constitutes a "protruding portion" of the present invention, is provided on the first case 20, and details of this configuration will be described later.

A first engaging surface and a second engaging surface, which are configured to engage with and disengage from each other (engage with each other and disengage from each other) as the rotation body 60 rotates, are formed between the first case 20 and the rotation body 60. Further, the first engaging surface and the second engaging surface are configured to form a temporary locking portion for temporarily locking the rotation body 60 relative to the first case 20 by restricting the rotation body 60 from rotating in the first direction (refer to an arrow F1 in FIG. 10) by the first engaging surface and the second engaging surface engaging with each other. As shown in FIG. 9, in this embodiment, the first protruding portion 33 having a first engaging surface 33a is provided on the first case 20, and a second protruding portion 68 having a second engaging surface 68a is provided on the rotation body 60, and details of this configuration will be described later.

As shown in FIG. 2, this first case 20 is configured by a bottom wall 21 and a circumferential wall 22 which is erected from a circumferential edge of the bottom wall 21 and has a bottomed frame shape which is opened on a side (an upper side) that faces the second case 40.

Figure 6:
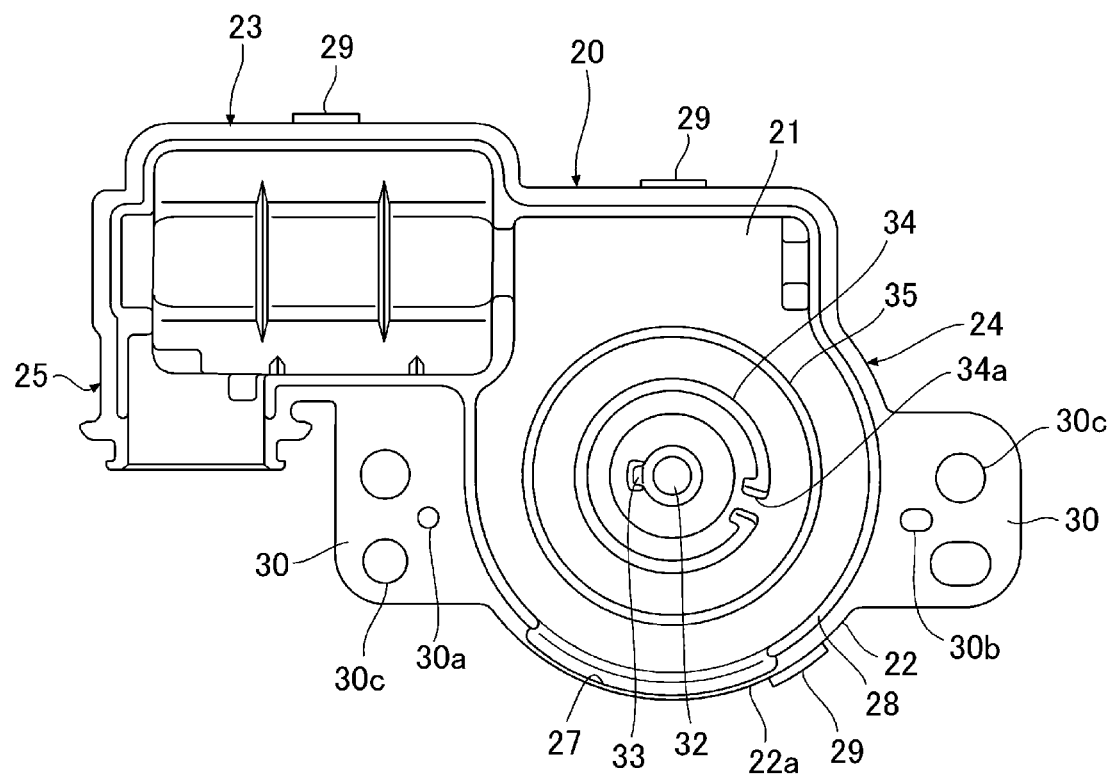
FIG. 6 is a plan view of a first case constituting a case in the same lock device.

Referring also to FIG. 6, this first case 20 has a motor installation portion 23 where the motor 13 is installed and a gear installation portion 24 which is provided adjacent to a side of the rotational shaft 13a of the motor 13 on the motor installation portion 23 and in which the worm 14 and the rotation body 60 are installed. In addition, in the first case 20, a connector inserting portion 25, into which a power supply connector, not shown, for supplying electricity to the motor 13 is inserted, is provided at one side portion of the motor installation portion 23. A portion on the circumferential wall 22 of the gear installation portion 24 which is opposite to the portion w % here the worm 14 is disposed is formed into a curved surface.

Further, as shown in FIGS. 2 and 6, an elastic member installation recessed portion 27 having a recessed groove shape, which is recessed to a predetermined depth from an end portion of the circumferential wall 22 of the gear installation portion 24 which is on a side that faces the second case 40, is formed over a predetermined range along a circumferential direction on the curved surface portion of the circumferential wall 22 which is opposite to the installation portion of the worm 14. A part of the elastic member 90 is accommodated to be disposed in place in this elastic member installation recessed portion 27.

Further, as shown in FIG. 2, a rib-shaped inner wall portion 28 is provided on the end portion of the circumferential wall 22 of the first case 20 which is on the side that faces the second case 40 in such a manner as to protrude therefrom while surrounding a circumferential portion of the gear installation portion 24 excluding one corresponding to the elastic member installation recessed portion 27 and a circumferential edge portion of the motor installation portion 23 excluding one corresponding to the connector inserting portion 25. Further, plural engaging protruding portions 29, which are configured to be used for assemblage to the second case 40, are provided at predetermined portions on an outer circumference of the circumferential wall 22 in such a manner as to protrude therefrom.

Additionally, a pair of attachment flanges 30, 30 protrudes individually from predetermined portions of the end portion of the circumferential wall 22 which is on the side that faces the second case 40. A circular hole 30a is formed in one attachment flange 30, while an elongate hole 30b is formed in the other attachment flange 30. Further, plural attachment holes 30c are formed in both the attachment flanges 30, 30 for attachment to the opening and closing body 5.

Figure 18:
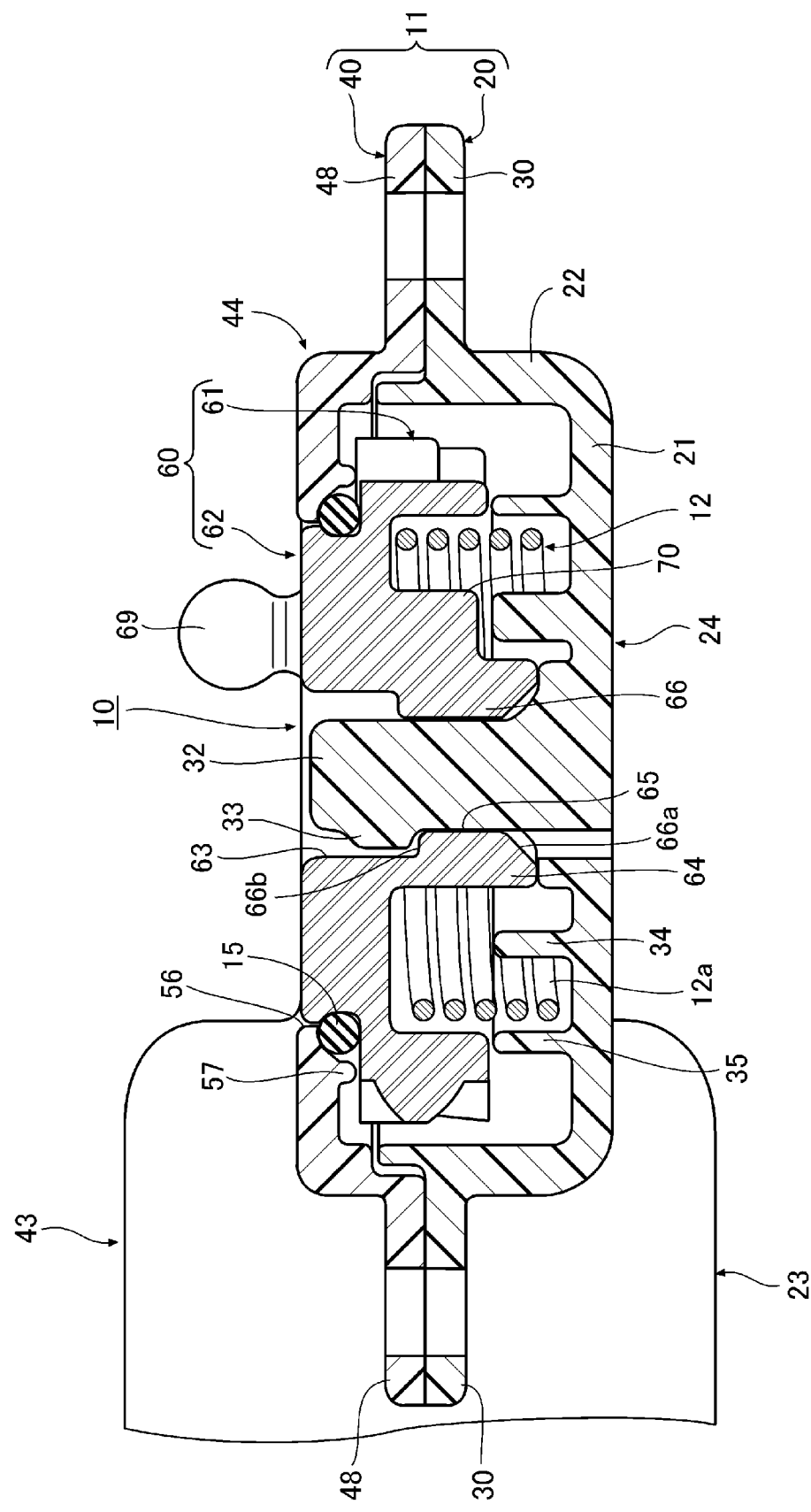
FIG. 18 is a sectional view taken along a line A-A indicated by arrows in FIG. 3.

As shown in FIGS. 2 and 18, the pivot 32 having substantially a cylindrical shape protrudes from the bottom wall 21 of the gear installation portion 24 in such a manner as to support rotatably the rotation body 60. In this embodiment, the pivot 32 protrudes integrally from the bottom wall 21 of the first case 20. The first protruding portion 33 having the first engaging surface 33a provided thereon protrudes from an outer circumference of a distal end portion in a protruding direction of the pivot 32 (refer to FIG. 10). In this embodiment, only one first protruding portion 33 is provided on the outer circumference of the pivot 32. As shown in FIG. 10, the first protruding portion 33 has a curved outer circumferential surface, and this outer circumferential surface constitutes the first engaging surface 33a. When the rotation body 60 is pivotally supported on the pivot 32, the first protruding portion 33 can pass through the cut-out 67 formed in the rotation body 60.

Figure 4:
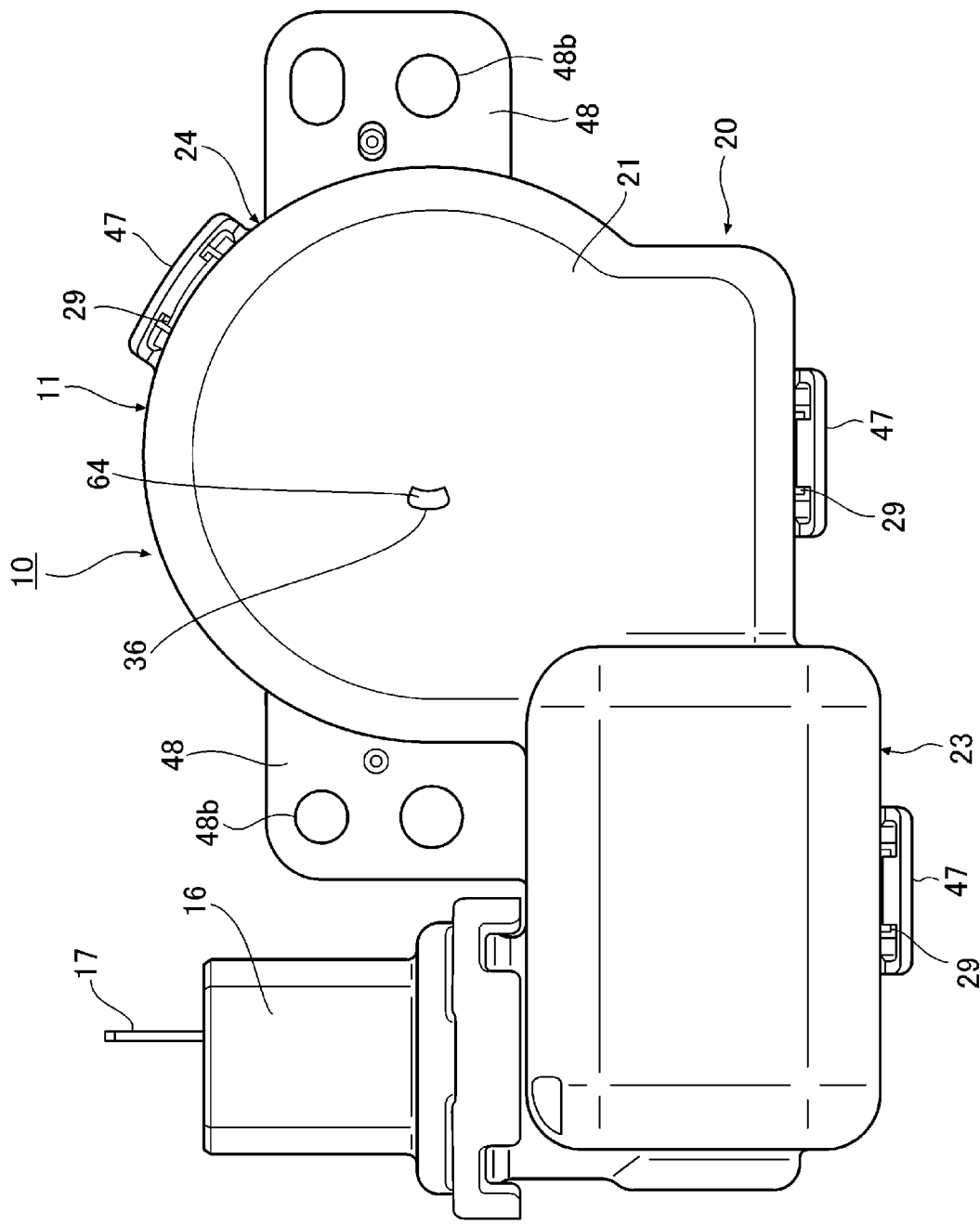
FIG. 4 is a bottom view of the same lock device.

As shown in FIG. 4, a protruding portion forming hole 36 for forming the first protruding portion 33 is formed in a position on the bottom wall 21 which matches the first protruding portion 33 of the pivot 32.

Further, a substantially C-shaped annular spring locking wall portion 34, having a notched groove-shaped spring locking groove 34a formed in a portion in a circumferential direction thereof, is provided on an outer circumference of the pivot 32 in the bottom wall 21 in such a manner as to protrude therefrom. The first arm portion 12b of the torsion spring 12 is locked in the spring locking groove 34a of the spring locking wall portion 34 (refer to FIG. 9). In addition, an annular spring holding wall portion 35 is provided on an outer circumference of the spring locking wall portion 34 in the bottom wall 21 in such a manner as to protrude therefrom. As shown in FIG. 9, the winding portion 12a of the torsion spring 12 is disposed on an inner side of the spring holding wall portion 35 so as to be held in place therein.

The shapes and structures of the individual portions (the bottom wall, the circumferential wall, the engaging protruding portion, the engaging piece, the attachment flange, the cut-out portion, and the like) of the first case that have been described heretofore are not limited to the modes described above.

Next, the rotation body 60 will be described in detail.

Figure 7A:
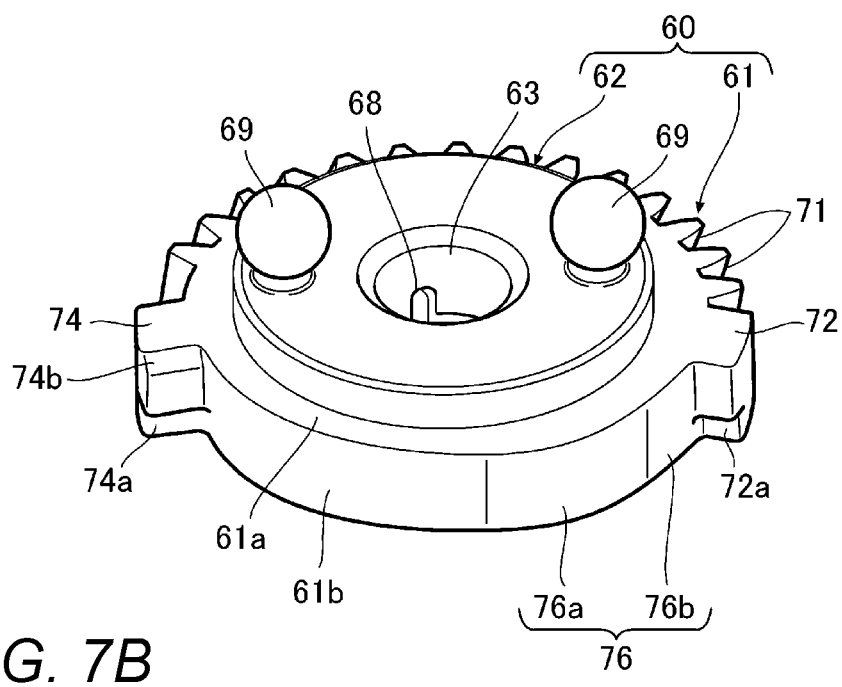
Figure 7B:
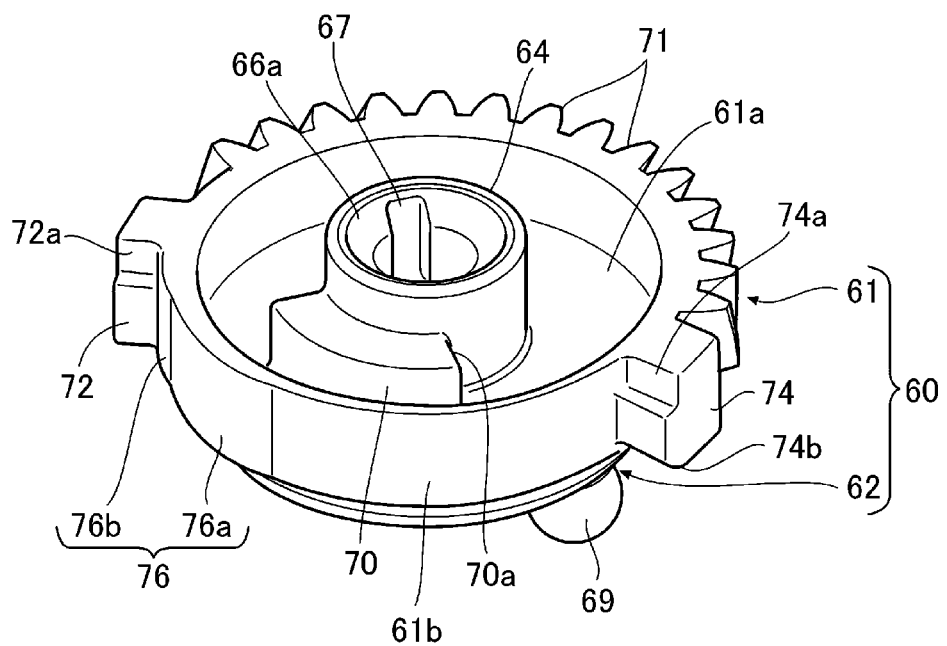

As shown in FIGS. 2, 7A and 7B, the rotation body 60 of this embodiment includes a gear portion 61 of a substantially cylindrical bottom-opened frame shape, which is configured by a ceiling wall 61a and a substantially cylindrical circumferential wall 61b which extends perpendicularly downwards from a circumferential edge of the ceiling wall 61a, and a rotational portion 62, which is provided coaxially and contiguously with this gear portion 61 and is smaller in diameter than the gear portion 61.

An O-shaped seal ring 15 is mounted around an outer circumference of the rotational portion 62, and this seal ring 15 is configured to seal a gap between an opening portion 56 of the second case 40 and the rotation body 60, as shown in FIG. 18.

In addition, as shown in FIG. 18, a shaft hole 63 is formed in a radial center of the rotational portion 62 and the ceiling wall 61a of the gear portion 61 in such a manner as to penetrate them. Further, as shown in FIGS. 6 and 18, a cylindrical portion 64 of a substantially cylindrical shape is provided on a rear side of the ceiling wall 61a of the gear portion 61 in such a manner as to protrude from a circumferential edge of the shaft hole 63.

A substantially C-shaped inner protruding portion 66, which has the cut-out 67 formed in a circumferential portion thereof by cutting out the relevant circumferential portion along an axial direction of the cylindrical portion 64, protrudes from an inner circumferential surface of the cylindrical portion 64. The first protruding portion 33 provided on the pivot 32 is allowed to pass through the cut-out 67. This inner protruding portion 66 is formed over a range from an axial lower end portion (an end portion facing the bottom wall 21 of the first case 20) to an axially halfway portion of the cylindrical portion 64 (refer to FIG. 18).

Then, an inner side portion of the inner protruding portion 66 of the cylindrical portion 64 and an inner side portion of the shaft hole 63 constitute the support hole 65 (refer to FIG. 18), and the pivot 32 provided on the first case 20 is inserted into this support hole 65, whereby the rotation body 60 is supported rotatably relative to the first case 20.

When the rotation body 60 is pivotally supported so as to be rotatable in the case 11 (herein, when the pivot 32 is passed through the support hole 65 and the rotation body 60 is pivotally supported so as to be rotatable relative to the pivot 32), as shown in FIG. 4, an end face (a distal end face in a protruding direction) of the cylindrical portion 64 is configured to close the hole (the protruding portion forming hole 36). Further, the shaft hole 63 is provided in such a manner as to be positioned on a circumferential edge of the support hole 65 (refer to FIG. 10).

In this embodiment, the pivot 32 is provided on the first case 20, and the support hole 65 through which the pivot 32 is passed is provided in the rotation body 60 so that the rotation body 60 is supported rotatably relative to the first case 20. However, on the contrary to this, a configuration may be adopted in which the pivot is provided on the rotation body, and the support hole is provided in the first case so that the rotation body is supported rotatably on the first case (this mode will be described in an embodiment which will be described later).

An inside diameter of the shaft hole 63 is formed larger than an outside diameter of the distal end portion of the pivot 32 including the first protruding portion 33 (refer to FIG. 18), and the pivot 32 including the first protruding portion 33 can be received inside this shaft hole 63.

Further, an inside diameter of the support hole 65 is set to such a dimension that the pivot 32 can be passed therethrough with little looseness. That is, the inside diameter of the support hole 65 is made slightly larger than an outside diameter of the pivot 32, so that a gap is formed between an inner circumference of the support hole 65 and an outer circumference of the pivot 32. As a result, the pivot 32 is supported pivotally relative to the support hole 65 with a predetermined looseness produced therebetween.

As shown in FIG. 18, a guide surface 66a of a mortar shape is formed on a lower end face of the inner protruding portion 66, facilitating the insertion of the pivot 32 when the pivot 32 is inserted from a lower end opening of the cylindrical portion 64. Further, a step-shaped locking surface 66b is provided at an upper end of the inner protruding portion 66 so that the first protruding portion 33 provided on the pivot 32 can be locked thereon (In FIG. 18, although the locking surface 66b stays away from the first protruding portion 33, in the case that an external force is exerted in a direction in which the rotation body 60 moves away from the bottom wall 21 of the first case 20, the first protruding portion 33 is locked on the locking surface 66b).

As shown in FIG. 7A, a pair of pivotal support portions 69, 69, each bulging into a spherical shape at a distal end thereof, is provided on a front surface (a surface on a side that faces the opening portion 56 of the second case 40) of the rotational portion 62 at portions facing each other across a rotational center of the rotational portion 62 (a position matching an axial center of the pivot 32) in such a manner as to protrude therefrom. Then, the pair of pivotal support portions 69, 69 is inserted in the proximal end portions 83, 83 of the pair of locking members 80, 81 while being retained, whereby the proximal end portions 83, 83 of the pair of locking members 80, 81 are pivotally supported at the portions that face each other across the rotational center of the rotational portion 62. As a result, the pair of locking members 80, 81 is configured to slide in opposite directions in synchronism with each other when the rotation body 60 rotates (refer to FIG. 22).

As shown in FIG. 7B, a substantially fan-shaped locking portion 70 is provided on a rear surface side of the ceiling wall 61a of the gear portion 61 in such a manner as to protrude therefrom. This locking portion 70 is connected to an outer circumference of the cylindrical portion 64 on narrow proximal side thereof. The second arm portion 12c of the torsion spring 12, which constitutes the biasing means, is configured to be locked on a circumferential end face 70a of the locking portion 70. As has been described above, the first arm portion 12b of the torsion spring 12 is locked in the spring locking groove 34a provided in the first case 20, and with this first arm portion 12b spaced apart from the second arm portion 12c, the rotation body 60 is rotatably supported on the pivot 32. As a result, the rotation body 60 is rotationally biased in a direction in which the second arm portion 12c moves towards the first arm portion 12b of the torsion spring 12, that is, the direction indicated by the arrow F1 in FIGS. 19 and 22, whereby the engaging portions 82, 82 of the pair of locking members 80, 81 are biased in a direction in which the engaging portions 82, 82 are brought into engagement with the locking portions 3, 3.

Figure 12:
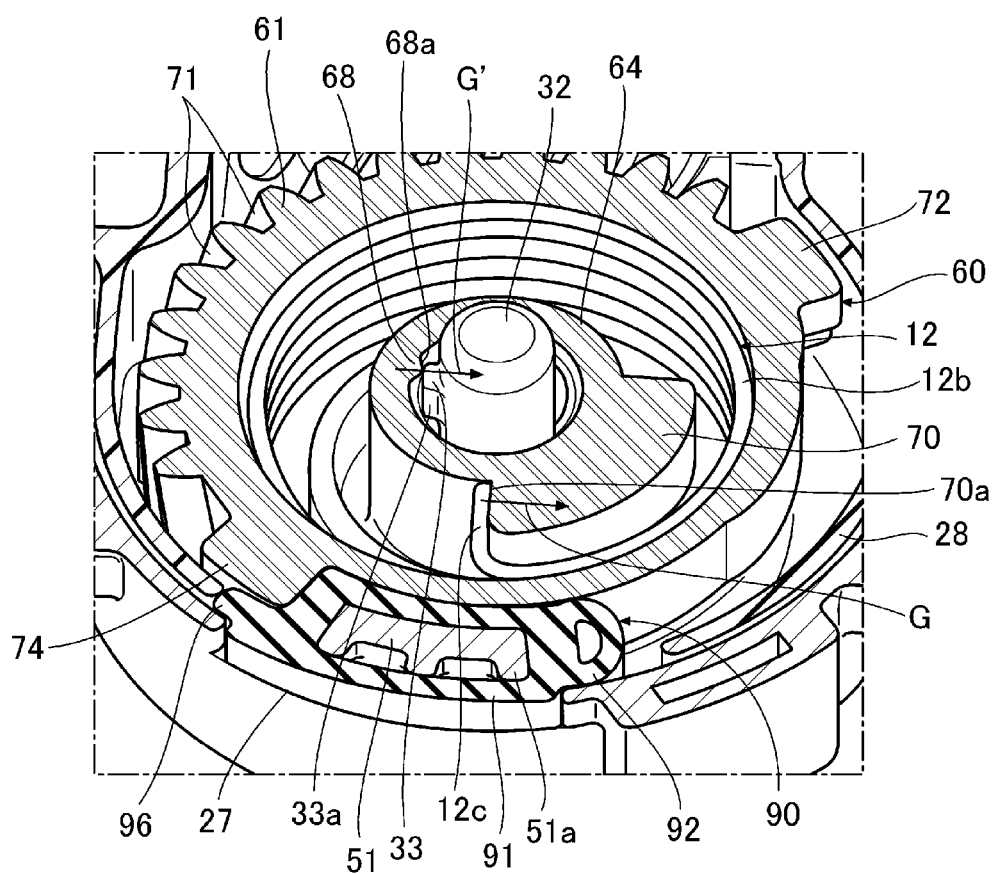
FIG. 12 is a sectional perspective view of a main part showing a state in which the rotation body is temporarily locked relative to the first case.

In addition, as shown in FIGS. 2, 7A and 7B, teeth 71 configure to mesh with the teeth 14a of the worm 14 are formed on an outer circumferential surface of the circumferential wall 61b of the gear portion 61 over a predetermined range along a circumferential direction of the circumferential wall 61b. Consequently, the rotation body 60, on which the teeth 71 configured to mesh with the teeth 14a of the worm 14 are provided, is configured to rotate against a rotational biasing force of the torsion spring 12 as a result of the worm 14 being rotated via the motor 13. In this embodiment, as shown in FIG. 12, the teeth 71 are formed on the circumferential wall 61b over a range from an outer surface in the vicinity of one pivotal support portion 69 to an outer surface in the vicinity of the other pivotal support portion 69 as viewed from an axial direction of the rotation body 60.

Further, the rotation body 60 includes a protruding portion provided at a portion on an outer circumference thereof. In this embodiment, as shown in FIG. 19, when viewing the rotational body 60 from the axial direction thereof, a first protruding portion 72 protrudes from a position in the vicinity of a circumferential end portion of the teeth 71 on the outer circumferential surface of the circumferential wall 61b of the gear portion 61, and a second protruding portion 74 protrudes from a position in the vicinity of the other circumferential end portion of the teeth 71 on the outer circumferential surface of the circumferential wall 61b.

Figure 20:
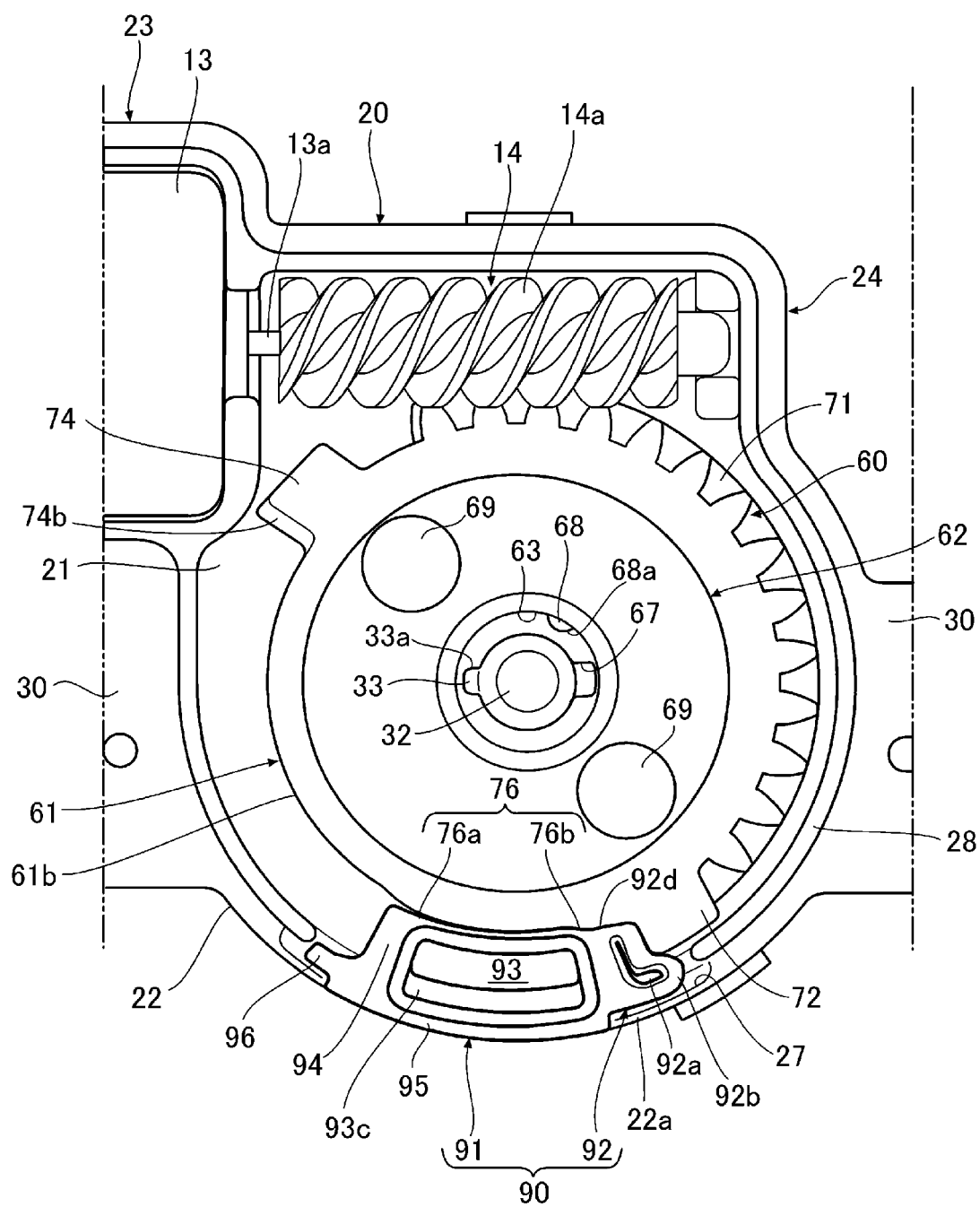
FIG. 20 is an explanatory plan view of a state in which the rotation body rotates from the state shown in FIG. 19 and its rotational position is restricted.

Then, as shown in FIG. 19, in such a state that the motor 13 remains inoperative, causing the worm 14 to keep from rotating, the second protruding portion 74 of the rotation body 60, which is rotationally biased in the first direction (refer to the arrow F1) by the rotational biasing force of the torsion spring 12, is brought into abutment with an abutment portion 94, which will be described later, of the elastic member 90, whereby a rotational position of the rotation body 60 is restricted. In addition, as shown in FIG. 20, when the motor 13 operates, causing the worm 14 to rotate to thereby cause the rotation body 60 to rotate to a maximum extent in the second direction (refer to the arrow F2 in FIG. 19), which is opposite to the first direction, against the rotational biasing force of the torsion spring 12, the first protruding portion 72 of the rotation body 60 is brought into abutment with a stopper portion 92, which will be described later, of the elastic member 90, whereby a rotational position of the rotation body 60 is restricted.

As shown in FIG. 7A, a tapered surface 74b is formed at one end portion in a thickness direction of a circumferential end surface of the second protruding portion 74 which faces the first protruding portion 72, the one end portion facing the ceiling wall 61a of the gear portion 61. This tapered surface 74b constitutes a surface which is to be pressed against a tapered surface 53 of a support portion 51 in the second case 40, which will be described later.

Further, as shown in FIGS. 7A and 7B, cut-outs 72a, 74a are formed on the first protruding portion 72 and the second protruding portion 74, respectively, on circumferential end surfaces thereof which is far away from the teeth 71 and abutment surfaces with the elastic member 90.

As shown in FIGS. 7A, 7B and 19, a slide contact portion 76 is provided at a portion on the outer circumference of the rotation body 60 in such a manner as to be brought into sliding contact with the elastic member 90 (here, so as to be brought into sliding contact with the stopper portion 92 of the elastic member 90) while the first protruding portion 72 is moving towards the stopper portion 92 of the elastic member 90. Further, the slide contact portion 76 is provided in such a manner as to extend along the outer circumference of the rotation body 60.

The slide contact portion 76 will be described in detail. An imaginary outer circumferential surface 61c of the circumferential wall 61b (a circumferential surface that would result in the event that the circumferential wall 61b is caused to extend with the constant outside diameter) is shown by two-dot chain line in FIG. 19. Then, as shown in FIG. 19, the slide contact portion 76 of this embodiment is configured by a first slide contact portion 76a, which protrudes radially outwards with respect to the imaginary outer circumferential surface 61c of the circumferential wall 61b substantially into an arc shape from a position closer to the first protruding portion 72 between the first protruding portion 72 and the second protruding portion 74 on the circumferential wall 61b of the gear portion 61, and a second slide contact portion 76b, which protrudes from a terminal end of the first slide contact portion 76a towards the first protruding portion 72 in such a manner as to gradually increase its height radially outwards and to protrude with respect to the first slide contact portion 76a.

As shown in FIG. 18, an inside diameter of the support hole 65 is smaller than an inside diameter of the shaft hole 63 and an outside diameter of a distal end portion of the pivot 32 including the first protruding portion 33 and matches an outside diameter of the pivot 32. As a result, as shown in FIG. 18, with the pivot 32 inserted in the support hole 65, the first protruding portion 33 of the pivot 32 is disposed so as not only to radially overlap with (lap over) the inner protruding portion 66 but also to face the locking surface 66b, so that the rotation body 60 can be supported rotatably relative to the pivot 32 with little looseness.

Then, the cut-out 67 in the rotation body 60 is aligned with the first protruding portion 33 of the pivot 32 (refer to FIG. 9), and the pivot 32 is inserted from a lower end opening of the cylindrical portion 64 to let the first protruding portion 33 out from an upper opening of the cut-out 67 (that is, the first protruding portion 33 is passed through the cut-out 67). Thereafter, the rotation member 60 is caused to rotate in the second direction indicated by the arrow F2 in FIG. 9 (the opposite direction to the first direction indicated by the arrow F1) against the rotational biasing force of the biasing means (the torsion spring 12), whereby the first protruding portion 33 is caused to deviate in the circumferential direction relative to the cut-out 67, thereby making it possible to retain and hold the rotation body 60 relative to the pivot 32.

That is, in this embodiment, the first protruding portion 33 provided on the first case 20, the cut-out 67 provided in the rotation body 60, and the locking surface 66b of the inner protruding portion 66 constitute "retaining portion" of the present invention.

As shown in FIG. 7A and FIG. 10, the second protruding portion 68 including the second engaging surface 68a provided thereon is provided on a circumferential edge of the support hole 65. In this embodiment, the second protruding portion 68 is provided at a predetermined circumferential portion on an inner circumferential surface of the shaft hole 63 which is provided so as to be positioned the circumferential edge of the support hole 65 in such a manner as to protrude from a position below the predetermined circumferential portion (a position facing the inner protruding portion 66). As with the first protruding portion 33, the second protruding portion 68 has a curved outer circumferential surface, and this outer circumferential surface constitutes the second engaging surface 68a. The second protruding portion 68 is connected to the locking surface 66b of the inner protruding portion 66 on a proximal side thereof.

Further, as shown in FIG. 9, the second protruding portion 68 is formed on the inner circumferential surface of the shaft hole 63 in a position in the vicinity of the cut-out 67. This second protruding portion 68 is configured to move towards and away from the first protruding portion 33 provided on the pivot 32, and the second engaging surface 68a of the second protruding portion 68 is configured to engage with (refer to FIGS. 10 and 11) and disengage from (refer to FIG. 3) the first engaging surface 33a of the first protruding portion 33. In this lock device 10, since a gap is made to be formed between the support hole 65 and the pivot 32, the second protruding portion 68 can ride over the first protruding portion 33 by causing the rotation body 60 to rotate via this gap in such a manner that the rotational center of the rotation body 60 deviates relative to the axial center of the pivot 32.

Figure 11:
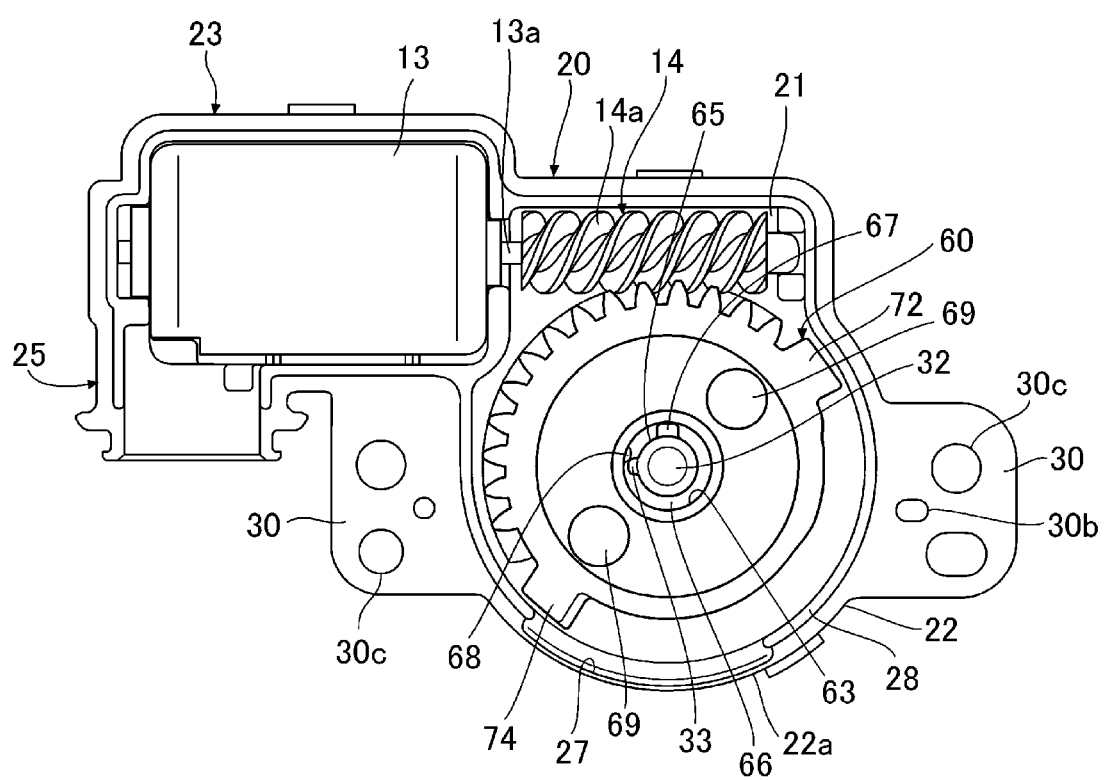
FIG. 11 is an explanatory plan view showing a state in which a worm is further assembled from the state shown in FIG. 10.

Incidentally, as has been described heretofore, the rotation body 60 is rotationally biased in the first direction indicated by the arrow F1 in FIGS. 10, 19, 22 by the rotational biasing force of the torsion spring 12. As this occurs, as shown in FIGS. 10 to 12, the first engaging surface 33a of the first protruding portion 33 and the second engaging surface 68a of the second protruding portion 68 come into engagement with each other, whereby the rotation body 60 is restricted from rotating against the rotational biasing force of the torsion spring 12 so as to be locked temporarily in this position. The first engaging surface 33a of the first protruding portion 33 and the second engaging surface 68a of the second protruding portion 68 constitute a "temporary locking portion" in the present invention which is configured to temporarily lock the rotation body 60 relative to the first case 20 by restricting the rotation body 60 from rotationally operating in the first direction.

As has also been described heretofore, the first protruding portion 33 and the second protruding portion 68 are allowed to ride over each other against the rotational biasing force of the biasing means (the torsion spring 12) by being caused to deviate from each other via the gap formed between the pivot 32 and the support hole 65. Further, after the second protruding portion 68 and the first protruding portion 33 ride over each other, a biasing force G of the biasing means is also applied in a direction in which the first protruding portion 33 and the second protruding portion 68 are brought into abutment with each other as shown in FIG. 12 (refer to reference sign G' in FIG. 12), whereby the second engaging surface 68a of the second protruding portion 68 is brought into engagement with the first engaging surface 33a of the first protruding portion 33, thereby making it possible to effect the temporary locking.

That is, as has been describe above, when the rotation body 60 is caused to rotate in the second direction indicated by the arrow F2 in FIG. 9 after aligning the cut-out 67 in the rotation body 60 with the first protruding portion 33 of the pivot 32 (refer to FIG. 9) and causing the first protruding portion 33 to pass through the cut-out 67, the rotation body 60 is caused to rotate in such a manner that the rotational center of the rotation body 60 deviates relative to the axial center of the pivot 32 via the gap formed between the support hole 65 and the pivot 32, whereby the second protruding portion 68 attempts to ride over the first protruding portion 33. At this time, as shown in FIG. 12, since the biasing force G' from the torsion spring 12, which is parallel to the biasing force G of the torsion spring 12 exerted from the second arm portion 12c to be applied on the circumferential end surface 70a of the locking portion 70 of the rotation body 60, is also applied on the second engaging surface 68a of the second protruding portion 68 and the first engaging surface 33a of the first protruding portion 33, the second engaging surface 68a of the second protruding portion 68 is brought into engagement with the first engaging surface 33a of the first protruding portion 33, as a result of which the temporary locking is executed.

The shape and structure of the rotation body that has been described heretofore are not limited to those described above, and hence, any shape and structure may be adopted for the rotation body, as long as the pivot, the support hole, the cut-out, the protruding portions, and the like are included between the rotation body and the first case.

Next, the second case 40 constituting the case 11 will be described in detail.

There are provided, between the second case 40 and the rotation body 60, a cam means, which is configured to cause the rotation body 60 to rotate through a predetermined angle in the second direction so that the first engaging surface 33a and the second engaging surface 68a, which are in an engaged state, disengage from each other when the second case 40 is assembled to the first case 20, and a stopper, which is configured to hold the rotation body 60 relative to the first case 20 with the first engaging surface 33a and the second engaging surface 68a disengaged from each other by engaging with the rotation body 60 after the rotation body 60 is caused to rotate by the cam means. The "stopper" of the present invention denotes the elastic member 90, and this elastic member 90 will be described in detail later.

Firstly, the second case 40 will be described. In this embodiment, the second case 40 has a frame shape, which is configured by a ceiling wall 41 and a circumferential wall 42 extending perpendicularly downwards from a circumferential edge of the ceiling wall 41 and is opened in a side (a lower side) facing the first case 20.

Figure 3:
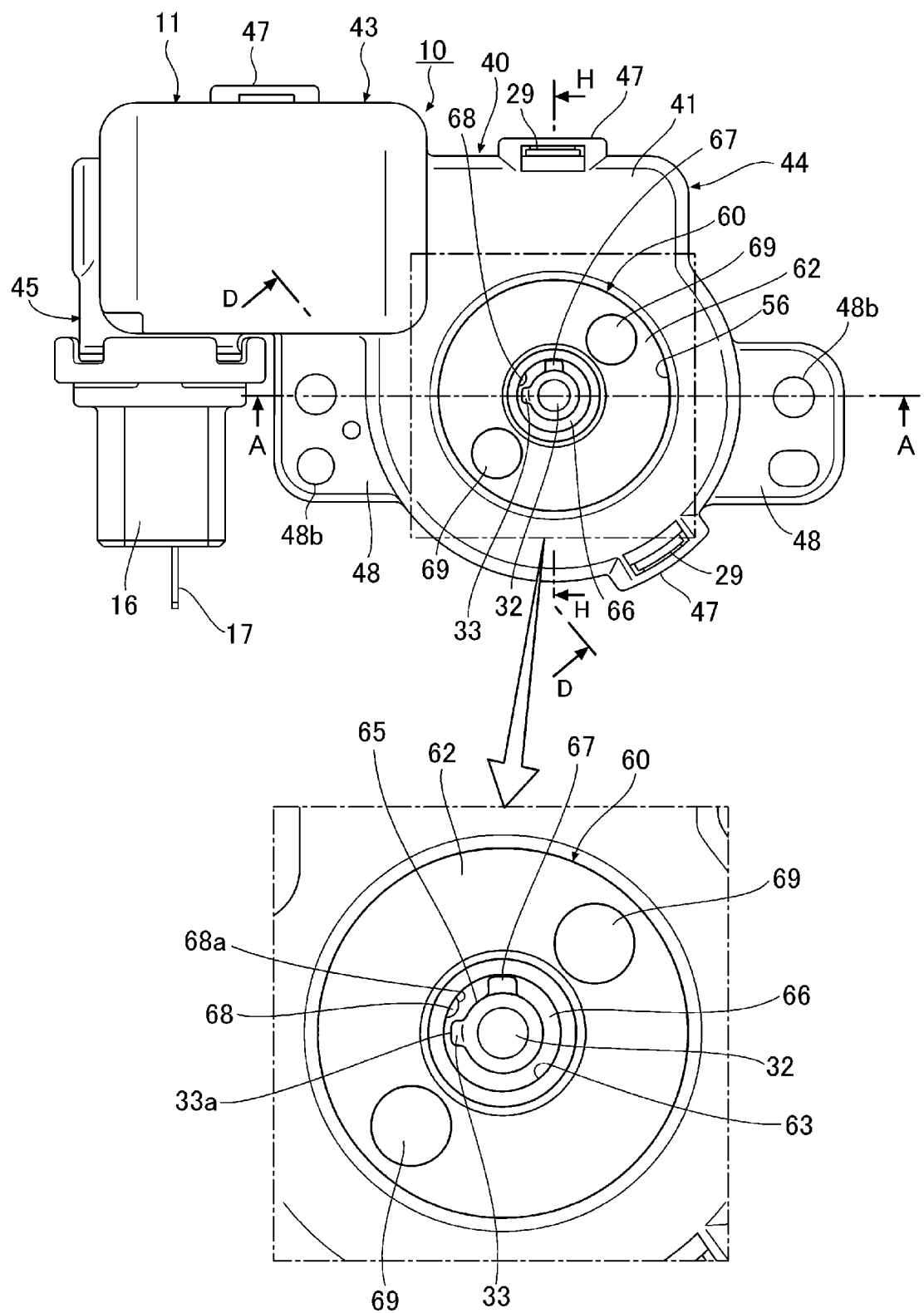
FIG. 3 is a plan view of the same lock device.

As shown in FIGS. 2 and 3, the second case 40 includes a motor installation portion 43, a gear installation portion 44, and a connector inserting portion 45, which are provided in positions corresponding to the positions of the motor installation portion 23, the gear installation portion 24, and the connector inserting portion 25 in the first case 20, respectively. A portion of the circumferential wall 42 on the gear installation portion 44 which is opposite to a portion where to install the worm 14 is formed into a curved surface.

Plural engaging pieces 47 are provided in such a manner as to extend perpendicularly downwards in positions on an outer circumference of the circumferential wall 42 which correspond to the positions where the plural engaging portions 29 are provided on the first case 20. By bringing the plural engaging pieces 47 into engagement with the plural engaging portions 29, as shown in FIG. 3 and FIG. 5B, the second case 40 is assembled to the first case 20, whereby the case 11 is constituted. Then, an installation space for the motor 13 is provided by the motor installation portions 23, 43, an installation space for the worm 14 and the rotation body 60 are provided by the gear installation portions 24, 44, and the connector inserting portion is provided and insertion of a power supply connector, not shown, is allowed by the connector inserting portions 25, 45, inside the case 11.

A cylindrical connector case 16, which is separate from the case 11, is configured to be assembled to the connector inserting portion. The pair of busbars 17, 17 and an O ring 18 are disposed inside the connector case 16, and the power supply connector, not shown, is also inserted into the connector case 16 to supply electricity to the motor 13.

Figure 13A:
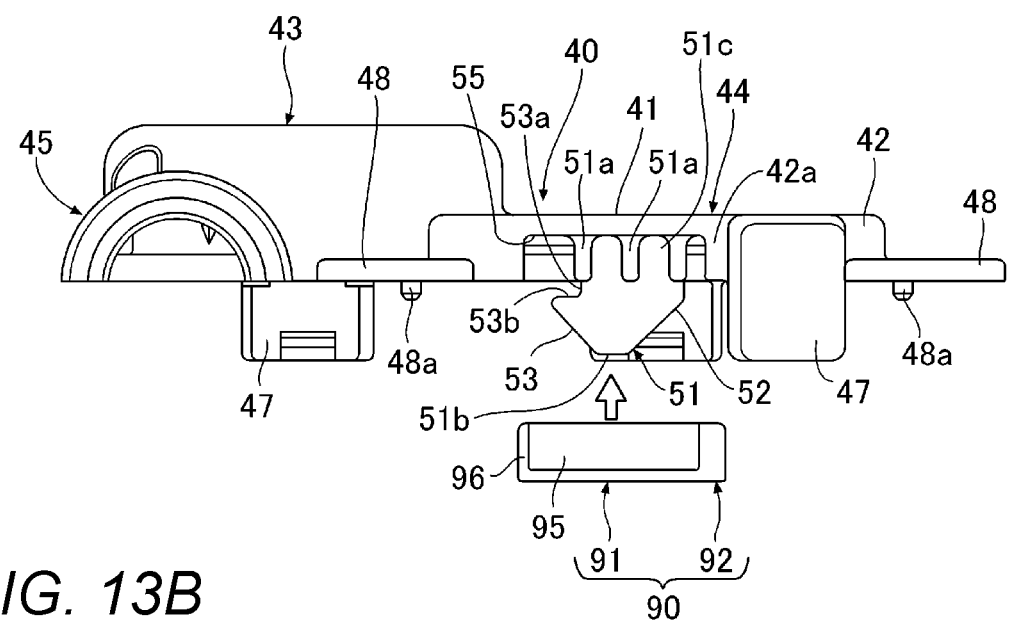

A pair of attachment flanges 48, 48 individually protrudes from an end portion of the circumferential wall 42 which is on a side that faces the first case 20 in positions which correspond to the positions of the pair of attachment flanges 30, 30 of the first case 20. As shown in FIG. 13A, a positioning pin 48a protrudes from an inner surface of each attachment flange 48. Then, when assembling the second case 40 to the first case 20, one positioning pin 48a is inserted into the circular hole 30a, while the other positioning pin 48a is inserted into the elongate hole 30b so as to allow a positional deviation, whereby the first case 20 and the second case 40 are assembled together by correcting dimensional errors of both the cases 20, 40. In addition, as shown in FIG. 2, plural attachment holes 48b are formed in each of the attachment flanges 48, 48 for attachment to the opening and closing body 5.

Further, as shown in FIG. 2 and FIG. 13A, the support portion 51, which is configured to support the elastic member 90 constituting the "stopper" of the present invention, protrudes from a position on the ceiling wall 41 which matches the elastic member installation recessed portion 27 provided on the first case 20 and an inner side with respect to the curved surface portion of the circumferential wall 42 on the gear installation portion 44 which is opposite to the installation portion for the worm 14.

This support portion 51 is formed into a wide protruding piece which extends along the circumferential direction of the circumferential wall 42 into a curved surface. Additionally, this support portion 51 is inserted into a support hole 93, which will be described later, of the elastic member 90 (refer to FIG. 8A). Further, the support portion 51 includes the cam means formed at a distal side thereof in a protruding direction and supports the elastic member 90 at a proximal side thereof.

Figure 13B:
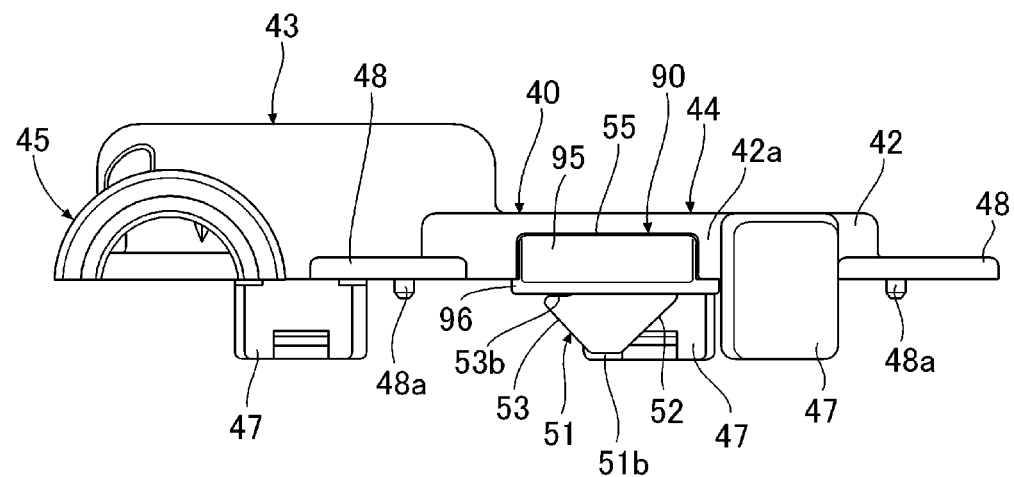

Specifically, as shown in FIGS. 13A and 13B, the support portion 51 of this embodiment includes tapered surfaces 52, 53 which are formed on both outer surfaces thereof in a width direction at a distal end portion thereof in the protruding direction in such a manner as to taper the support portion 51.

As shown in FIG. 13A, the support portion 51 of this embodiment includes a distal end portion 51b in the protruding direction thereof, which extends with a certain width, the tapered surface 52, which protrudes gradually higher from one end portion of the distal end portion 51b which is closer to a wall portion 42a, which will be described later, towards a proximal end portion 51*c* of the support portion 51, and the tapered surface 53, which protrudes gradually higher from the other end portion of the protruding portion 51*b* located on the opposite side of the wall portion 42*a* towards the proximal end portion 51*c* of the support portion 51.

Of the two tapered surfaces 52, 53, the tapered surface 53 located on the opposite side of the wall portion 42*a* and the tapered surface 74*b* provided on the second protruding portion 74 of the rotation body 60 constitute a "cam means" of the present invention.

That is, as described above, the cut-out 67 in the rotation body 60 is aligned with the first protruding portion 33 of the pivot 32 for positional alignment (refer to FIG. 9), the pivot 32 is inserted from the lower end opening of the cylindrical portion 64, and the first protruding portion 33 is caused to pass through the cut-out 67. Thereafter, the rotation body 60 is caused to rotate in the second direction indicated by the arrow F2 in FIG. 9 against the rotational biasing force of the torsion spring 12 so that the first protruding portion 33 is positioned in the circumferential direction relative to the cut-out 67, whereby the rotation body 60 is retained and held relative to the pivot 32. Then, as shown in FIGS. 10 and 11, the protruding portions 33, 68 are caused to ride over each other so as to bring both the engaging surfaces 33*a*, 68*a* into engagement with each other against the rotational biasing force of the torsion sprint 12, whereby the rotation body 60 is temporarily locked so as not to rotate further in the first direction.

Figure 14:
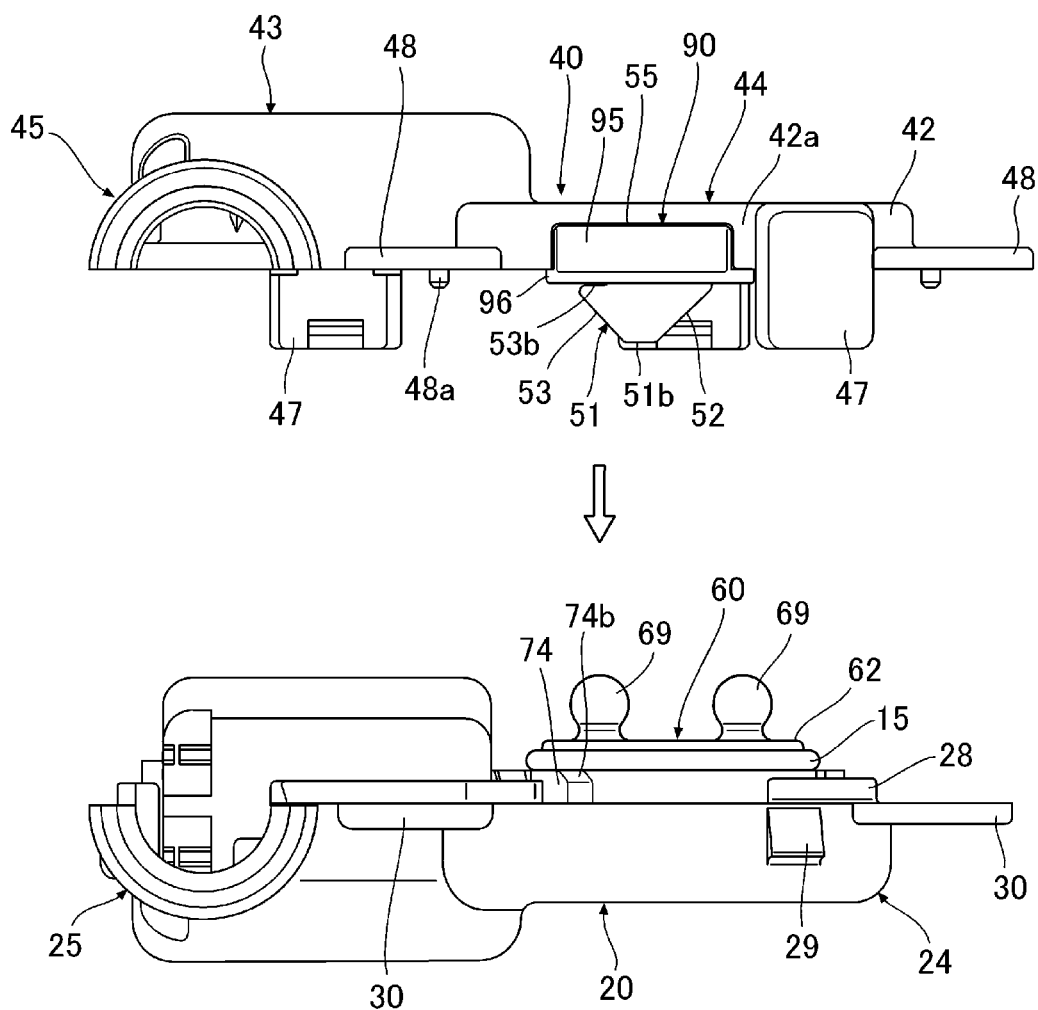
FIG. 14 shows an explanatory front view showing a state in which the second case is assembled to the first case from the state shown in FIG. 13B.

After the rotation body 60 is temporarily locked as described above, the second case 40, in which the elastic member 90 constituting the stopper is supported on the support portion 51, is gradually pushed towards the first case 20 as shown in FIG. 14.

Figure 15A:
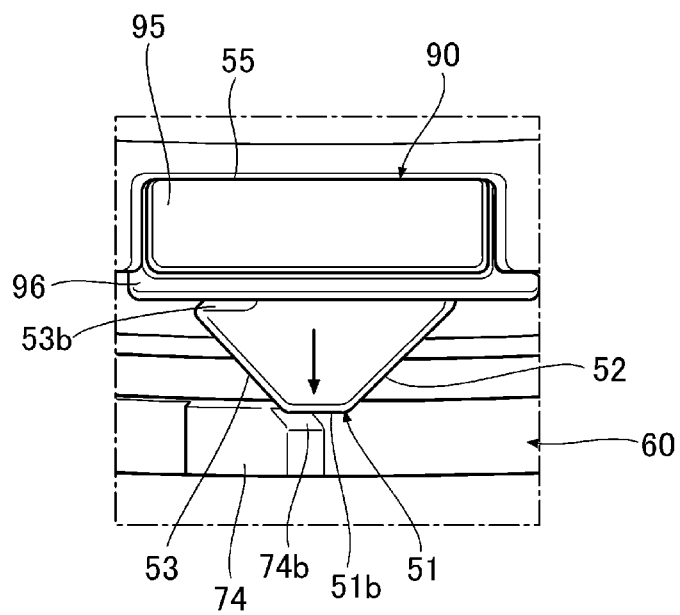
FIG. 15A is an enlarged perspective view of a main part showing an operation of a cam means when the second case is assembled to the first case.

Then, as shown in FIG. 15A, the tapered surface 53 of the support portion 51 presses against the tapered surface 74*b* of the second protruding portion 74 of the rotation body 60, whereby the rotation body 60 is caused to rotate against the rotational biasing force of the torsion spring 12 in the direction in which the second engaging surface 68*a* of the second protruding portion 68 moves away from the first engaging surface 33*a* of the first protruding portion 33.

Figure 15B:
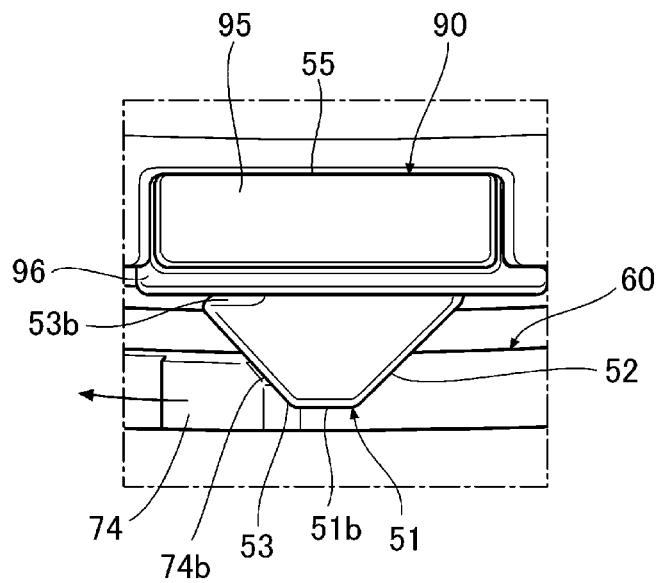
FIG. 15B is an enlarged perspective view of the main part showing a state in which the second case is pushed further from the state shown in FIG. 15A.

Thereafter, when the second case 40 is pushed further, as shown in FIG. 15B, the tapered surface 53 of the support portion 51 further presses against the tapered surface 74*b* of the second protruding portion 74 of the rotation body 60. Then, the rotation body 60 is caused to rotate against the rotational biasing force of the torsion spring 12 in the direction in which the second engaging surface 68*a* of the second protruding portion 68 moves away further from the first engaging surface 33*a* of the first protruding portion 33.

Figure 16:
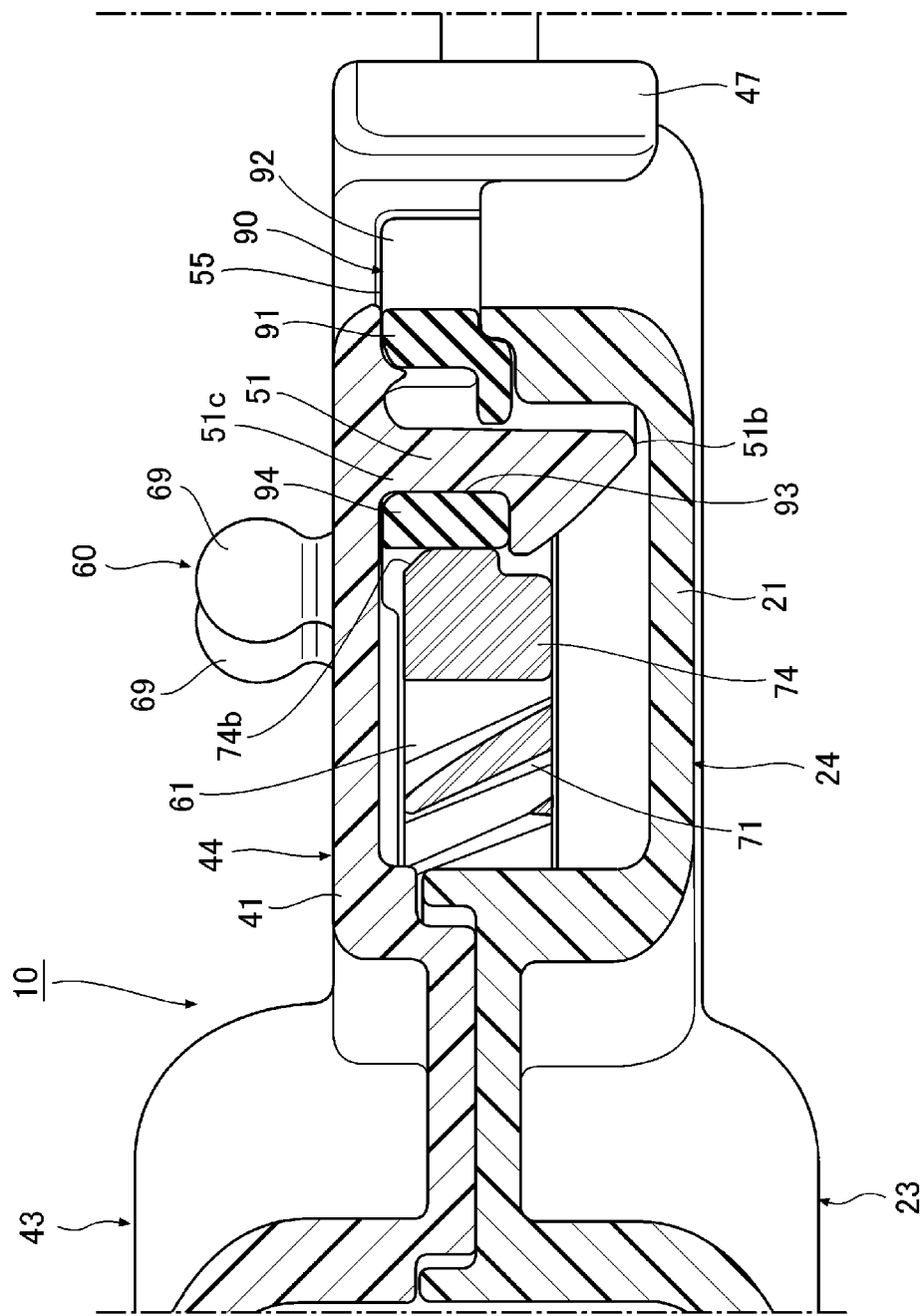
FIG. 16 is a sectional view showing a state in which the second case is assembled to the first case, and the rotation body is held relative to the first case by the elastic member constituting the stopper with the first engaging surface and the second engaging surface left disengaged from each other and taken along a line D-D indicated by arrows in FIG. 3.
Figure 17:
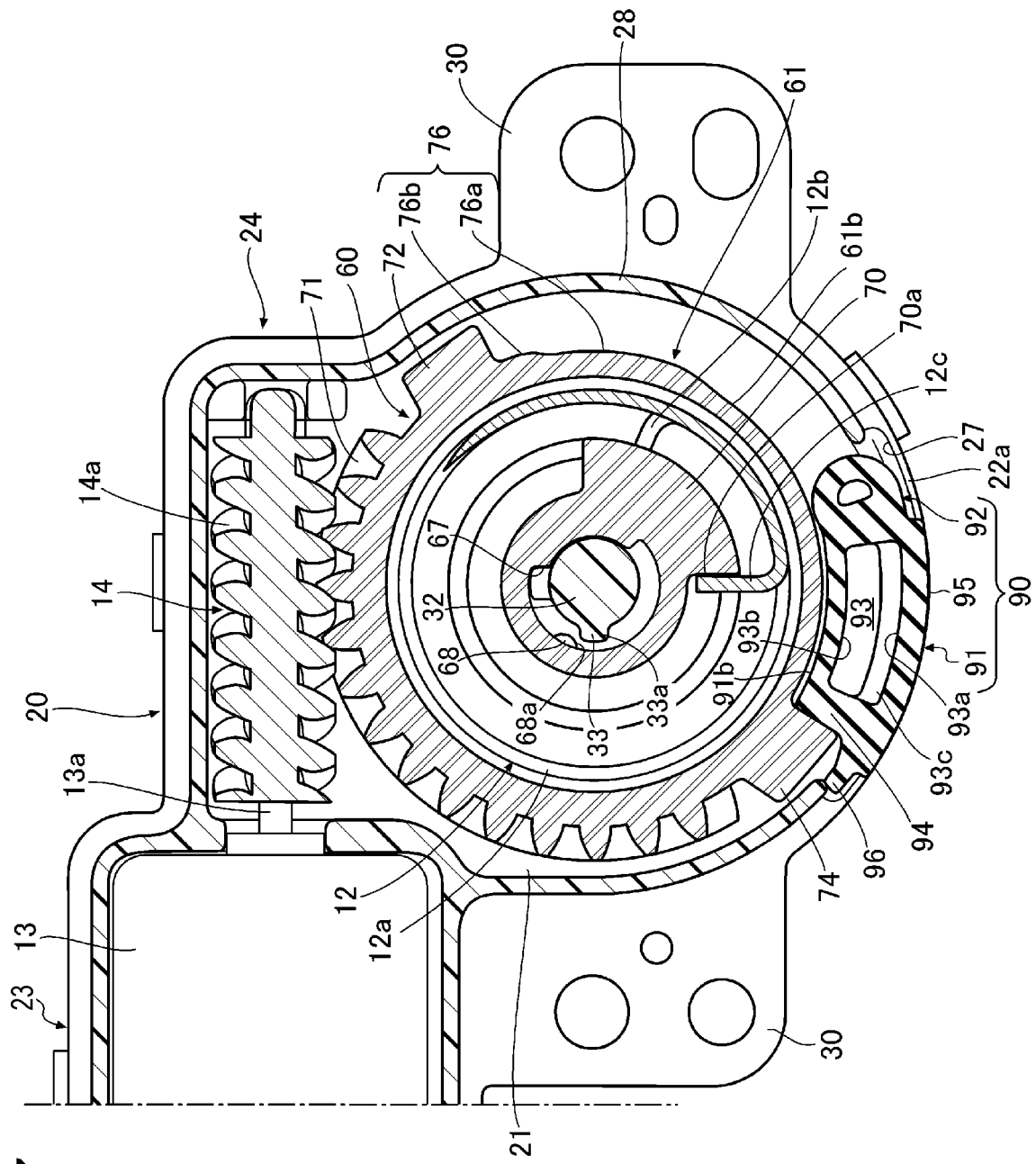
FIG. 17 is a sectional view taken along a line B-B indicated by arrows in FIG. 5B.

When the second case 40 is pushed further from the state described above so that the plural engaging pieces 47 of the second case 40 are brought into engagement with the plural engaging protruding portions 29 of the first case 20 for assemblage of the second case 40 to the first case 20, as shown in FIG. 16, the base portion 91 of the elastic member 90 supported on the support portion 51 of the second case 40 is brought into engagement with the second protruding portion 74 of the rotation body 60. As a result, as shown in FIGS. 3, 17, and 19, the rotation body 60 is held relative to the first case 20 by the elastic member 90 with the first engaging surface 33*a* and the second engaging surface 68*a* disengaged from each other (that is, the rotation body 60 is stopped on the second case 20).

In this state, as shown in FIG. 16, a part of the elastic member 90 is held between the outer circumference of the rotation body 60 and an inner circumference of the support portion 51. Here, the abutment portion 94, which will be described later, of the base portion 91 of the elastic member 90 is held between an end surface of the second protruding portion 74 of the rotation body 60 on the tapered surface 74*b* is formed and a side surface of the support portion 51 on a cut-out 53*a*.

A locking step portion 53*b* is formed via the cut-out portion 53*a* on a proximal end side of the tapered surface 53 located on the opposite side of the wall portion 42*a*, which will be described later. This locking step portion 53*b* is configured to be locked on a circumferential edge of a rear side of the support hole 93 in the elastic member 90. As a result, the elastic member 90 is supported at the proximal end side of the support portion 51.

Further, as shown in FIG. 2 and FIG. 13A, plural ribs 51*a* are provided at predetermined intervals on an outer surface of the proximal end side of the support portion 51 in such a manner as to protrude therefrom. These plural ribs 51*a* are configured to be brought into abutment with an inner surface 93*a* of an enlarged-diameter portion of the support hole 93 in the elastic member 90 (refer to FIG. 8B).

A cut-out portion 55 is formed in the outer circumference of the case in a position which faces the support portion 51 on which the base portion 91 of the elastic member 90 is locked. In the case of this embodiment, in the second case 40, the cut-out portion 55, which is cut out into an arc shape along the circumferential wall 42, is formed in the curved surface portion of the circumferential wall 42 on the gear installation portion 44 which is opposite to the installation portion of the worm 14 in a position which faces the support portion 51.

As shown in FIGS. 5B, 13A and 13B, a circumferential edge portion of a circumferential end of the cut-out portion 55 in the circumferential wall on the gear installation portion 44 is formed into the wall portion 42*a* which is disposed in a position which faces the outer circumference of the rotation body 60.

In addition, as shown in FIG. 2, the circular opening portion 56 is formed in the ceiling wall 41 on the gear installation portion 44 so that the rotational portion 62 of the rotation body 60 is allowed to protrude therethrough. Further, as shown in FIG. 18, a rib 57 is provided on a circumferential edge, excluding a portion thereof corresponding to the support portion 51, on a rear side (a side facing an inner space of the case) of the opening portion 56 in such a manner as to protrude therefrom.

The shapes and structures of the portions (the bottom wall, the circumferential wall, the engaging protruding portions, the engaging pieces, the attachment flanges, the cut-out portion, and the like) of the second case that has been described heretofore are not limited to those described above.

Figure 8A:
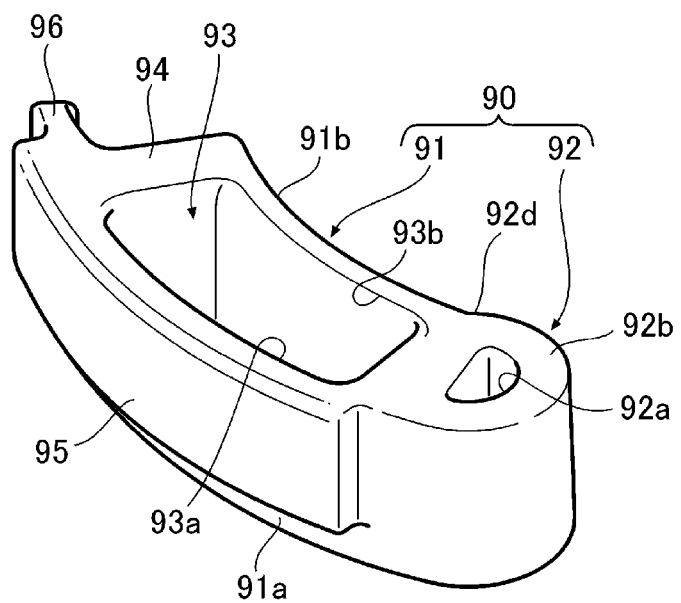
Figure 8B:
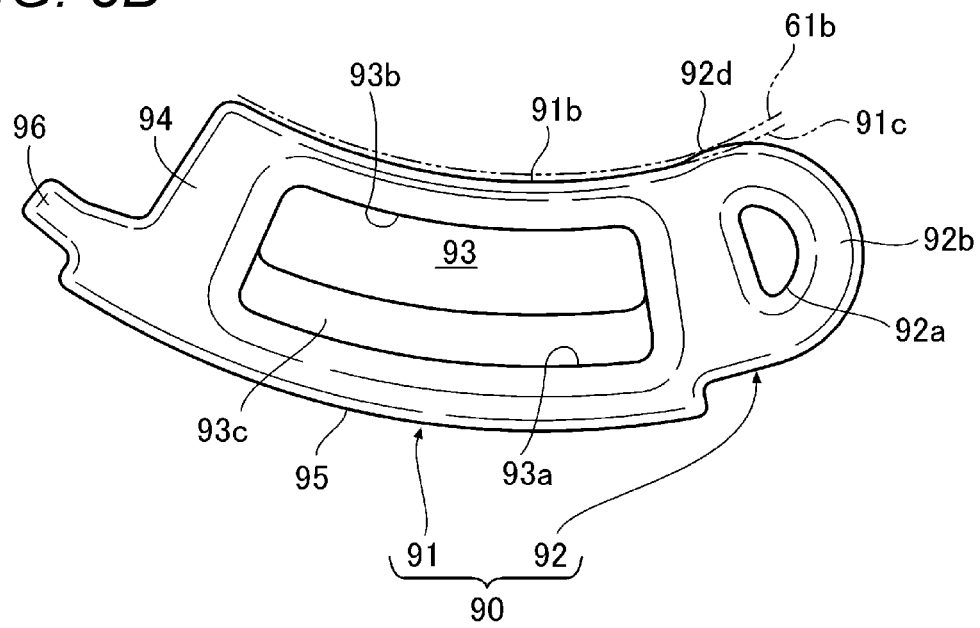

On the other hand, as shown in FIGS. 8A and 8B, the elastic member 90 constituting the "stopper" of the present invention is an elastic member formed from a predetermined elastic material and having a cushioning property and has the base portion 91 which is locked to be supported on the support portion 51 provided on the case 11 and the stopper portion 92 configured to be brought into abutment with the first protruding portion 72 of the rotation body 60 to restrict the maximum rotational position of the rotation body 60 in the predetermined direction.

As described above, the elastic member 90 is configured to be brought into engagement with the rotation body 60 after the rotation body 60 is caused to rotate by the cam means (here, the tapered surface 53 of the support portion 51 and the tapered surface 74b of the rotation body 60) so as to hold the rotation body 60 relative to the first case 20 with the first engaging surface 33a and the second engaging surface 68a disengaged from each other.

The elastic member 90 of this embodiment is formed into a shape of a thick block which extends a predetermined length and which is formed into a predetermined thickness in such a manner as to form a curved surface as a whole so as to match the curved surface-like circumferential walls 22, 42 on the gear installation portion of the first case 20 and the second case 40 which constitute the case 11.

Both longitudinal side surfaces 91a, 91b of the base portion 91 are formed into a curved surface. One side surface 91a constitutes a surface that is disposed in such a manner as to face inner sides of the circumferential walls 22, 42 on the gear installation portion of both the cases 20, 40. The other side surface 91b constitutes a surface that is disposed in such a manner as to face an outer side of the circumferential wall 61b of the gear portion 61 of the rotation body 60.

The support hole 93, into which the support portion 51 is inserted to be locked in place, is formed on an inner side of the base portion 91. This support hole 93 is formed into an elongate hole which extends along a longitudinal direction of the base portion 91 and whose inner surfaces 93a, 93b extending in the longitudinal direction are each formed into a curved surface. Further, the other longitudinal end portion of the base portion 91 is formed into an abutment portion 94, and the second protruding portion 74 of the rotation body 60 which is rotationally biased by the torsion spring 12 is brought into abutment with the abutment portion 94 in such a state that the motor 13 is inoperative and the worm 14 does not rotate (refer to FIG. 19).

Figure 21:
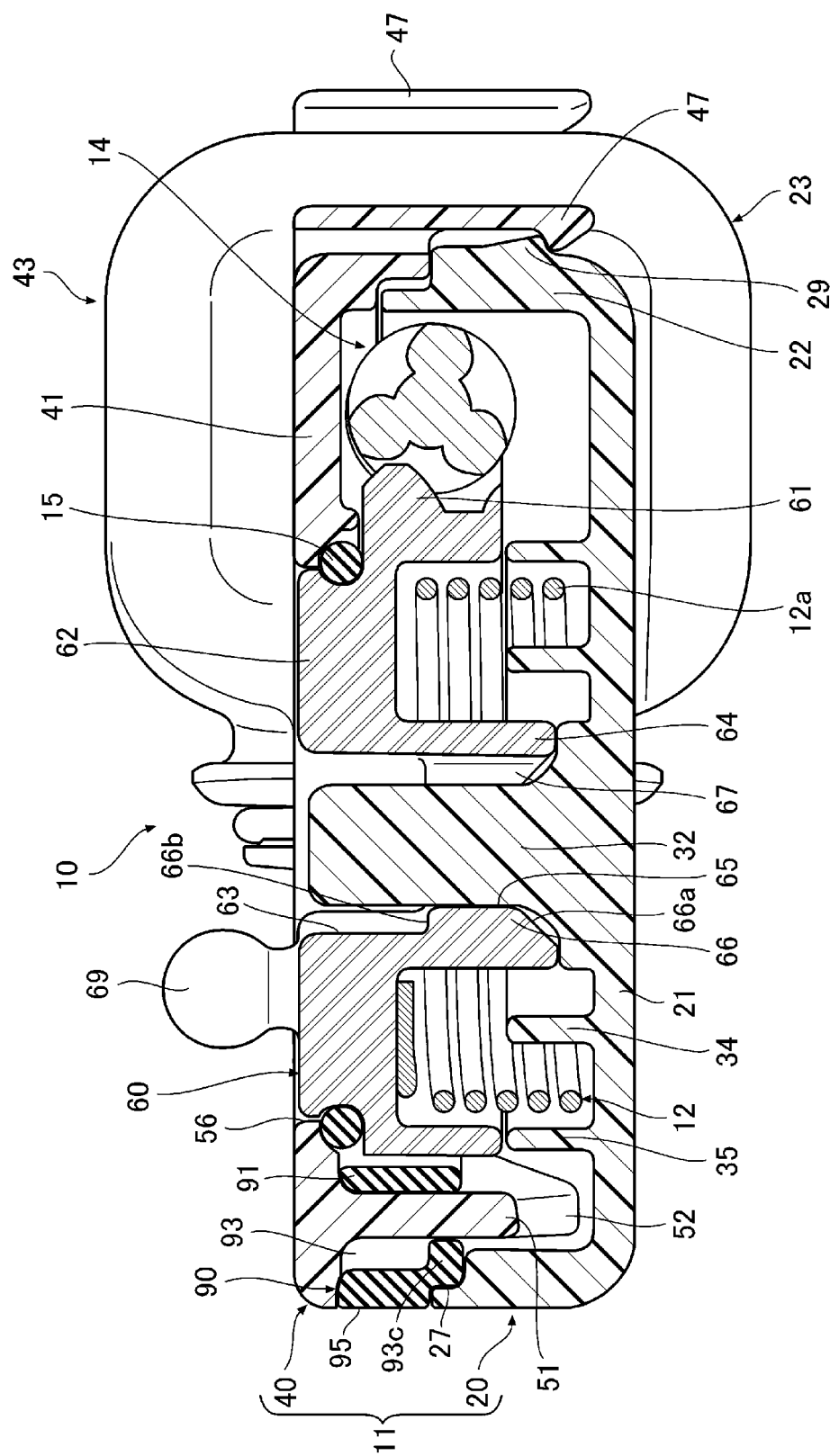
FIG. 21 is a sectional view taken along a line H-H indicated by arrows in FIG. 3.

A thin protruding rib 93c protrudes from the inner surface 93a, which is one of the inner surfaces, of the support hole 93 along the circumferential direction on a bottom portion side of the support hole 93. As shown in FIG. 21, an inner space of the support hole 93 is defined into a reduced-diameter portion in which only the distal end portion of the support portion 51 is inserted and an enlarged-diameter portion which is larger in diameter than the reduced-diameter portion and in which the support portion 51 and the plural ribs 51a are inserted, via the rib 93c. Then, when the support portion 51 is inserted into the support hole 93, the plural ribs 51a provided on the support portion 51 are brought into abutment with the inner surface 93a of the enlarged-diameter portion of the support hole 93, whereby not only is the looseness of the elastic member 90 relative to the support portion 51 suppressed, but also the base portion 91 is supported on the support portion 51 as a result of the locking step portion 53b of the support portion 51 being locked on the circumferential edge of the rear side of the support hole 93, allowing the elastic member 90 to be supported on the support portion 51 (refer to FIG. 13B).

In addition, a protruding wall portion 95, which is configured to fit in the cut-out portion 55 in the second case 40 so as to close the cut-out portion 55, protrudes from the one side surface 91a of the base portion 91 over a predetermined range from an end surface on a side of a ceiling portion to a side of a bottom portion of the base portion 91.

Figure 5A:
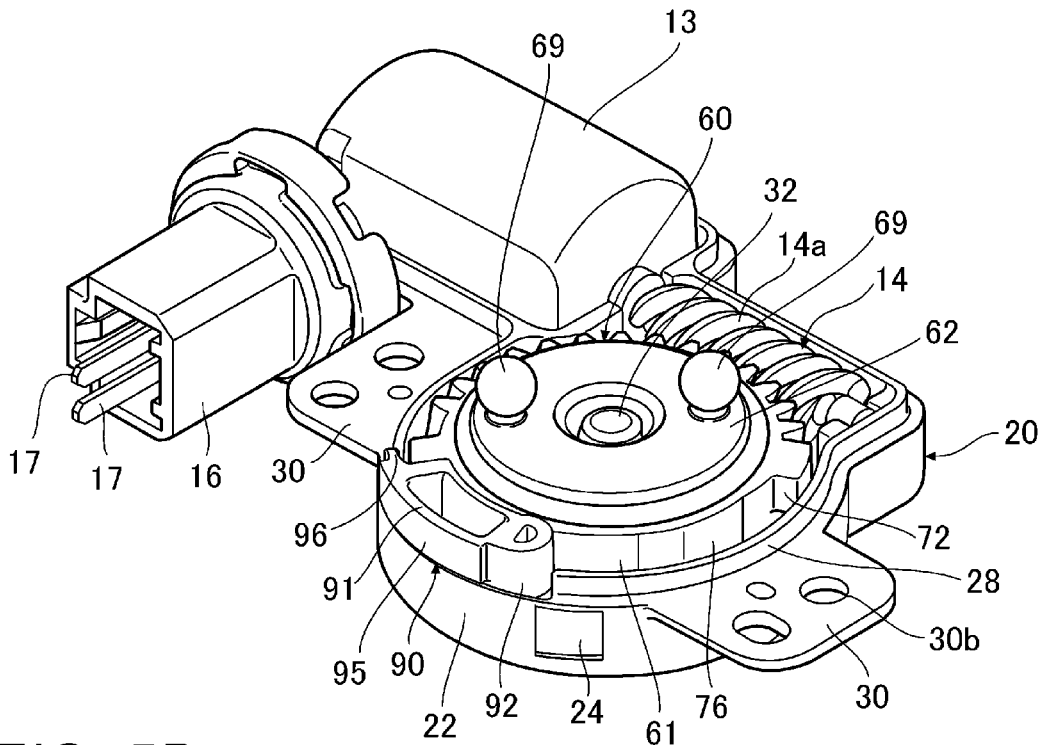
FIG. 5A is a perspective view of a state in which a second case is removed in the same lock device.
Figure 5B:
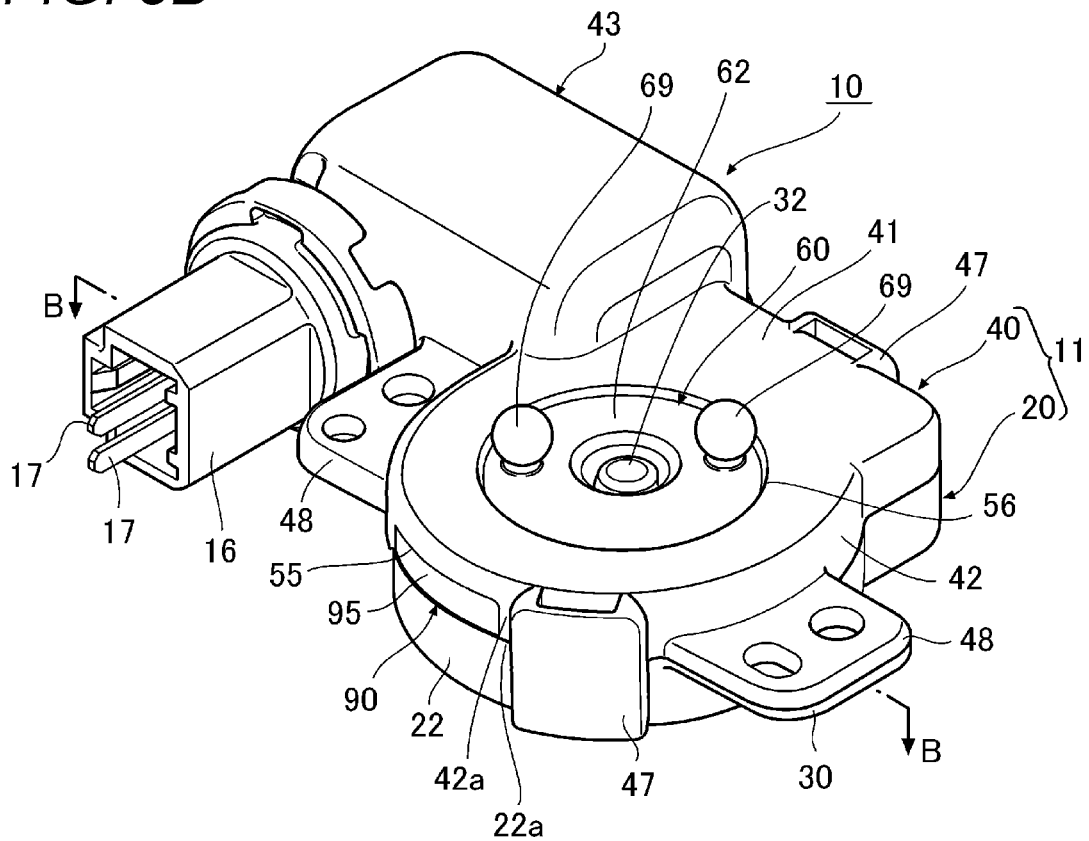
FIG. 5B is a perspective view of the same lock device.

Then, as a result of the base portion 91 being supported on the support portion 51, in the elastic member 90 supported on the support portion 51, with the second case 40 assembled to the first case 20, a portion of the base portion 91 which is lower than the protruding wall portion 95 is accommodated to be disposed in place within the elastic member installation recessed portion 27 of the first case 20, and a lower end portion of the protruding wall portion 95 is locked on an upper end portion of the circumferential wall 22 in the first case 20 that is provided with the elastic member installation recessed portion 27 (refer to FIG. 5A). In addition, in the state described above, an upper end portion of the protruding wall portion 95 is locked on an upper end portion of the cut-out portion 55 of the second case 40, and both circumferential end portions of the protruding wall portion 95 are locked individually on circumferential end portions of the cut-out portion 55, so that the cut-out portion 55 is closed (refer to FIG. 13B). In such a state that the elastic member 90 is supported on the support portion 51, an outer surface of the protruding wall portion 95 of the elastic member 90 is flush with outer surfaces of the circumferential wall 42 and the wall portion 42a around the circumferential edge of the cut-out portion 55, in the second case 40 (refer to FIG. 5B).

As shown in FIGS. 8A and 8B, an extending portion 96, which is formed into a shape of a plate which is narrower in width than the base portion 91, extends from the other longitudinal end portion of the base portion 91 in a position closer to the side surface 91a. As shown in FIG. 19, this extending portion 96 is disposed so as to face the other circumferential end portion of the elastic member installation recessed portion 27 in the circumferential wall 22 on the gear installation portion 24 of the first case 20 in such a state that the base portion 91 is accommodated to be disposed within the elastic member installation recessed portion 27.

On the other hand, the stopper portion 92 extends from a longitudinal end portion of the base portion 91. In this embodiment, the stopper portion 92 includes a substantially semi-circular deforming hole 92a formed on an inner side thereof and an arch-shaped deforming wall portion 92b which is formed via the deforming hole 92a. An outer circumference of the deforming wall portion 92b is formed into a round curved surface.

Further, the stopper portion 92 includes a bulging portion 92d which bulges towards the outer surface of the rotation body 60 with respect to a surface of the base portion 91 which faces the outer circumference of the rotation body 60 (the other side face 91b). To describe this, in FIG. 8B, an imaginary outer surface 91c of the side surface 91b of the base portion 91 (a circumferential surface that would result in the event that the side surface 91b is caused to extend with the constant inside diameter) is indicated by a two-dot chain line. Then, as shown in FIG. 8B, in this embodiment, the bulging portion 92d is provided at a proximal end portion of the arch-shaped deforming wall portion 92b in the stopper portion 92 on the side surface 91b of the base portion 91 in such a manner as to bulge towards an outer surface of the circumferential wall 61b of the gear portion 61 of the rotation body 60 with respect to the imaginary outer surface 91c.

For example, rubber materials such as butyl rubber (isobutylene-isoprene rubber: IIR), nitrile rubber (NBR), ethylene propylene rubber (EPM, EPDM), butadiene rubber (BR), urethane-based rubber, silicone-based rubber, fluorine-based rubber, acryl-based rubber, and the like, thermoplastic elastic elastomers, and the like can preferably be used as an elastic material for forming the elastic member 90 that has been described heretofore. It is preferable to use an elastic material having a low impact resilience (large impact absorption performance) in particular.

With the elastic member 90 described heretofore, in the process of restricting the maximum rotational position of the rotation body 60 by the abutment of the first protruding portion 72 against the stopper portion 92 as a result of the rotation of the rotation body 60 against the rotational biasing force of the torsion spring 12, the bulging portion 92d of the stopper portion 92 is brought into sliding contact with the slide contact portions 76a, 76b of the rotation body 60 to thereby attenuate the rotational speed of the rotation body 60, then the deforming wall portion 92b of the stopper portion 92 is brought into abutment with the first protruding portion 72 while flexing to be deformed, whereby striking noise (impact noise) is reduced which would be generated when the first protruding portion 72 of the rotation body 60 comes into collision with the elastic member 90.

The individual portions (the base portion 91, the stopper portion 92, the protruding wall portion 95, the extending portion 96, and the like) constituting the elastic member 90 are all formed integrally.

The shape and structure of the elastic member that has been described heretofore are not limited to those described above, and hence, any shape and structure can be adopted as long as the elastic member can hold the rotation body with the first engaging surface and the second engaging surface disengaged from each other.

Function and Effect

Next, the function and effect of the lock device 10 constructed as has been described heretofore will be described.

That is, when the opening and closing body 5 is pushed into the opening portion 2 to close the opening portion 2 in the fixed body 1, the tapered surfaces of the engaging portions 82, 82 of the pair of locking members 80, 81 are pressed against by both inner surfaces of the opening portion 2, whereby the pair of locking members 80, 81 are pulled into the opening and closing body 5 against the biasing force of the torsion spring 12. Then, when the engaging portions 82, 82 reach the corresponding locking portions 3, 3, the rotation body 60 is rotationally biased by the biasing force of the torsion spring 12, and the locking members 80, 81 are pushed outwards of the opening and closing body 5, bringing the engaging portions 82, 82 into engagement with the corresponding locking portions 3, 3, whereby the opening and closing body 5 can be locked in a closed state while closing the opening portion 2 in the fixed body 1 (refer to FIG. 1A and FIG. 22).

On the other hand, when opening the opening and closing body 5 from the opening portion 2 in the fixed body 1, the switch 7 exposed from the front surface side of the opening and closing body 5 is operated. Then, electricity is supplied to the motor 13 through the busbars 17, 17 from the power supply connector connected to the power supply, not shown, whereby not only does the rotational shaft 13a of the motor 13 rotate, but also the worm 14 rotates. In association with this, the rotation body 60 rotates in the second direction indicated by the arrow F2 in FIG. 19 against the rotational biasing force of the torsion spring 12. As a result, since the engaging portions 82, 82 of the pair of locking members 80, 81 slide in the direction in which the engaging portions 82, 82 disengage from the corresponding locking portions 3, 3 so as to release the engagement of the engaging portion 82 with the locking portion 3, the opening and closing body 5 can be moved from the opening portion 2 in the fixed body 1 so as to open the opening portion 2 in the fixed body 1 (refer to FIG. 1B and FIG. 23).

As this time, in the lock device 10, when the motor 13 as shown in FIG. 19 is activated from the state in which the motor 13 is inoperative and the worm 14 does not rotate to rotate the worm 14, the rotation body 60 rotates against the rotational biasing force of the torsion spring 12 in the direction in which the first protruding portion 72 of the rotation body 60 moves towards the stopper portion 92 of the elastic member 90 (refer to the arrow F2 in FIG. 19).

At this time, since the first slide contact portion 76a and the second slide contact portion 76b of the slide contact portion 76 of the rotation body 60 come into slide contact with the stopper portion 92 (here, the bulging portion 92d of the stopper portion 92) of the elastic member 90 sequentially, and the stopper portion 92 of the elastic member 90 eventually comes into collision with the protruding portion (the first protruding portion 72) of the rotation body 60 while attenuating the rotational speed of the rotation body 60 to thereby stop the rotation of the rotation body 60 as shown in FIG. 20, the striking noise can be reduced.

Then, in the lock device 10, the pivot 32 is inserted into the support hole 65 with the first protruding portion 33 of the pivot 32 aligned with the cut-out 67 in the rotation body 60, and the first protruding portion 33 is allowed to pass through the cut-out 67, after that, the rotation body 60 is caused to rotate in the second direction indicated by the arrow F2 in FIG. 9 against the rotational biasing force of the torsion spring 12, whereby the second protruding portion 68 rides over the first protruding portion 33, and not only is the rotation body 60 retained and held relative to the first case 20 by the retaining portion (the first protruding portion 33, the cut-out 67 and the locking surface 66b), but also the first engaging surface 33a of the first protruding portion 33 and the second engaging surface 68a of the second protruding portion 68, which constitute the temporary locking portion, are brought into engagement with each other, thereby making it possible to temporarily lock the rotation body 60 relative to the first case 20 so that the rotation body 60 does not rotate further in the first direction (refer to FIG. 10).

When the second case 40 is assembled to the first case 20 in this state as shown in FIG. 14, the cam means (the tapered surface 53 of the support portion 51 and the tapered surface 74b of the rotation body 60) causes the rotation body 60 to rotate (refer to in FIGS. 15A and 15B), then the elastic member 90, which constitutes the stopper, comes into engagement with the rotation body 60 as shown in FIG. 16, whereby as shown in FIGS. 3, 17, and 19, the rotation body 60 is held relative to the first case 20 with the first engaging surface 33a and the second engaging surface 68a disengaged from each other, so that the rotation body 60 can be stopped relative to the first case 20.

In the case that the rotation body 60 is caused to rotate in the second direction while the rotation body 60 is being stopped relative to the second case 20, since both the engaging surfaces 33a, 68a of both the protruding portions 33, 68 disengage from each other, both the protruding portions 33, 68 are never brought into engagement with each other. Even though the rotation body 60 attempts to rotate in the first direction while the rotation body 60 is being stopped relative to the second case 20, since the elastic member 90, which constitutes the stopper, is in engagement with the rotation body 60 and both the engaging surfaces 33a, 68a of both the protruding portions 33, 68 are held in the positions where the engaging surfaces 33a, 68a are separated apart from each other, both the protruding portions 33, 68 are never brought into engagement with each other, and the rotation body 60 staying in the state shown in FIG. 19 is restricted from rotating in the first direction indicated by the arrow F1 (the rotation body 60, which is stopped, is restricted from rotating back in the first direction).

Then, in this lock device 10, as described above, the pivot 32 is inserted into the support hole 65 with the first protruding portion 33 aligned with the cut-out 67, and the first protruding portion 33 is caused to pass through the cut-out 67, then the rotation body 60 is caused to rotate in the second direction, which is opposite to the first direction, whereby the rotation body 60 is not only retained and held relative to the first case 20 by the retaining portion, but also both the engaging surfaces 33a, 68a of the temporary locking portion are brought into engagement with each other to thereby restrict the rotation body 60 from rotating in the first direction, as a result of which the rotation body 60 is temporarily locked relative to the first case 20. Then, when the second case 40 is assembled to the first case 20 in this state, the cam means causes the rotation body 60 to rotate, then the elastic member 90, which constitutes the stopper, comes into engagement with the rotation body 60, whereby the rotation body 60 is held relative to the first case 20 with the first engaging surface 33a and the second engaging surface 68a disengaged from each other. By adopting this configuration, the rotation body 60 can be securely restricted from rotating (the rotation body 60 staying in the state shown in FIG. 19 can be restricted from rotating in the first direction).

In addition, in this lock device 10, as described above, since the rotation body 60 is configured to be restricted from rotating by the stopper, the surface areas of the engaging surfaces 33a, 68a of both the protruding portions 33, 68, which constitute the temporary locking portion, can be reduced. That is, in the event that the surface areas of both the engaging surfaces 33a, 68a of both the protruding portions 33, 68 are small, in causing the rotation body 60 to rotate in the second direction indicated by the arrow F2 in FIG. 9 in order to temporarily lock the rotation body 60 to the first case 20, the second engaging surface 68a of the second protruding portion 68 is allowed to easily ride over the first engaging surface 33a of the first protruding portion 33, whereby no positive elasticity needs to be applied as in the distal end side of the rotation restriction claw of the side lock device of Patent Literature 1 described above. That is, with this lock device 10, since no U-shaped slit or the like needs to be formed in order to impart elasticity as in the rotation restriction claw of Patent Literature 1 as a result of providing the engaging surfaces 33a, 68a as described above, no unnecessary opening needs to be formed in the rotation body 60 or the case 11, thereby making it possible to suppress the leakage of noise.

Then, the switch 7 exposed from the front surface side of the opening and closing body 5 is operated to, as described above, cause the rotation body 60 to rotate against the rotational biasing force of the torsion spring 12 via the motor 13, the worm 14, and the like, so that the engaging portions 82, 82 of the pair of locking members 80, 81 are caused to slide in the direction in which the engaging portions 82, 82 disengage from the corresponding locking portions 3, 3 so as to release the engagement between the engaging portion 82 and the locking portion 3, whereby the opening and closing body 5 is left opened from the opening portion 2 in the fixed body 1. Thereafter, when the hand is released from the switch 7, the rotation body 60 is rotationally biased in the first direction indicated by the arrow F1 by the rotational biasing force of the torsion spring 12, whereby the locking members 80, 81 are pushed outwards of the opening and closing body 5.

At this time, as shown in FIGS. 3, 17, and 19, since the rotation body 60 is held in the position where the first engaging surface 33a and the second engaging surface 68a are disengaged from each other by the elastic member 90, both the engaging surfaces 33a, 68a of the temporary locking portion can be restricted from coming into engagement with each other when the rotation body 60 is rotationally biased by the biasing means after the engagement between the locking members 80, 81 and the locking portions 3, 3 is released, as a result of which the striking noise can be reduced which is generated when both the engaging surfaces 33a, 68a are brought into engagement with each other.

In addition, when the second case 40 is assembled to the first case 20 in such a state that the rotation body 60 is retained and held to the first case 20 and the rotation body 60 is temporarily locked relative to the first case 20 as a result of both the engaging surfaces 33a, 68a being brought into engagement with each other (refer to FIGS. 10 and 11), the rotation body 60 can be caused to rotate in the second direction by the cam means so as to be brought into engagement with the elastic member 90 (refer to FIG. 16), and hence, the rotation body 60 does not have to be caused to rotate manually, thereby enhancing the assembly work efficiency of the lock device 10.

In this embodiment, as shown in FIGS. 13A and 13B, the support portion 51, on which the elastic member 90 constituting the stopper is supported, protrudes from the second case 40, and the cam means (here, the tapered surface 53) is formed at the distal end side of the support portion 51, and the elastic member 90 is supported at the proximal end side thereof.

According to the mode described above, since the rotation body 60 is caused to rotate against the rotational biasing force of the biasing means by the cam means (the tapered surface 53) formed at the distal end side of the support portion 51 with the simple operation of only pushing the second case 40 relative to the first case 20 in such a state that the rotation body 60 is retained and held to the first case 20 and the rotation body 60 is temporarily locked relative to the first case 20 as a result of both the engaging surfaces 33a, 68a being brought into engagement with each other (refer to FIGS. 10 and 11), and thereafter, the elastic member 90 supported at the proximal end side of the support portion 51 is brought into engagement with the rotation body 60, the assembly work efficiency of the lock device 10 can further be enhanced.

Further, in this embodiment, the first protruding portion 33 including the first engaging surface 33a provided thereon is provided on the outer circumference of the pivot 32, and the second protruding portion 68 including the second engaging surface 68a provided thereon is provided on the circumferential edge of the support hole 65. Both the protruding portions 33, 68 constitute the temporary locking portion, and the first protruding portion 33 and the second protruding portion 68 are caused to deviate via the gap formed between the pivot 32 and the support hole 65, whereby the protruding portions 33, 68 are configured to ride over each other against the rotational biasing force of the biasing means (the torsion spring 12). After the protruding portions 33, 68 ride over each other, the biasing force G of the biasing means is also applied in the direction in which the first protruding portion 33 and the second protruding portion 68 are brought into abutment with each other as shown in FIG. 12 (refer to the biasing force G' in FIG. 12). As a result, the second engaging surface 68a of the second protruding portion 68 is brought into engagement with the first engaging surface 33a of the first protruding portion 33 for execution of the temporary locking.

According to the mode described above, the biasing force G of the biasing means is also applied in the direction in which the first protruding portion 33 and the second protruding portion 68 are brought into abutment with each other as shown in FIG. 12 (refer to the biasing force G' in FIG. 12) after the protruding portions 33, 68 ride over each other, whereby the second engaging surface 68a of the second protruding portion 68 is brought into engagement with the first engaging surface 33a of the first protruding portion 33 for execution of the temporary locking of the rotation body 60. As a result, the release of the temporary locking can be suppressed which would occur as a result of the protruding portions 33, 68 riding over each other in the returning direction due to the rotational biasing force of the biasing means, whereby the rotation body 60 can be securely locked temporarily.

In this embodiment, the pivot 32 protrudes integrally from the first case 20, and the cylindrical portion 64, into which the pivot 32 is inserted, is formed in the rotation body 60. The first protruding portion 33, on which the first engaging surface 33a is provided, is provided on the outer circumference of the pivot 32, and the second protruding portion 68, on which the second engaging surface 68a is provided, is provided on the circumferential edge of the support hole 65. The hole for forming the first protruding portion 33 (the protruding portion forming hole 36) is formed in the first case 20. As a result, when the rotation body 60 is pivotally supported in the case 11 so as to be rotatable, the end surface of the cylindrical portion 64 is configured to close the hole as shown in FIG. 4.

According to the mode described above, since the protruding portion forming hole 36 formed in the first case 20 is closed by the end surface of the cylindrical portion 64 provided on the rotation body 60 as shown in FIG. 4 when the rotation body 60 is pivotally supported in the case 11 so as to be rotatable, the striking noise generated inside the case can be further suppressed from releasing to the outside of the case.

Another Embodiment of Lock Device for Opening and Closing Body

Figure 24:
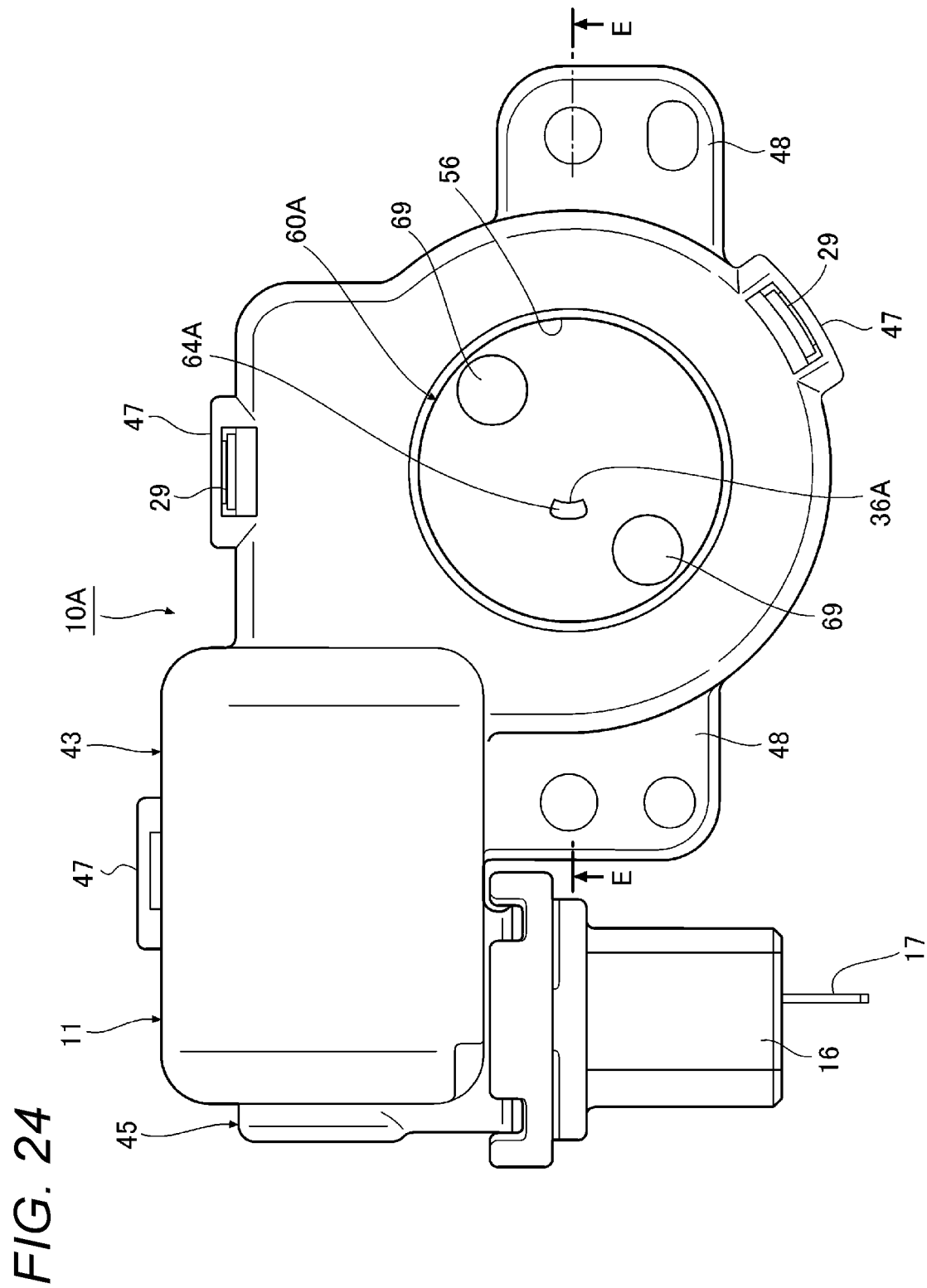
FIG. 24 is a plan view showing another embodiment of a lock device for an opening and closing body according to the present invention.
Figure 25:
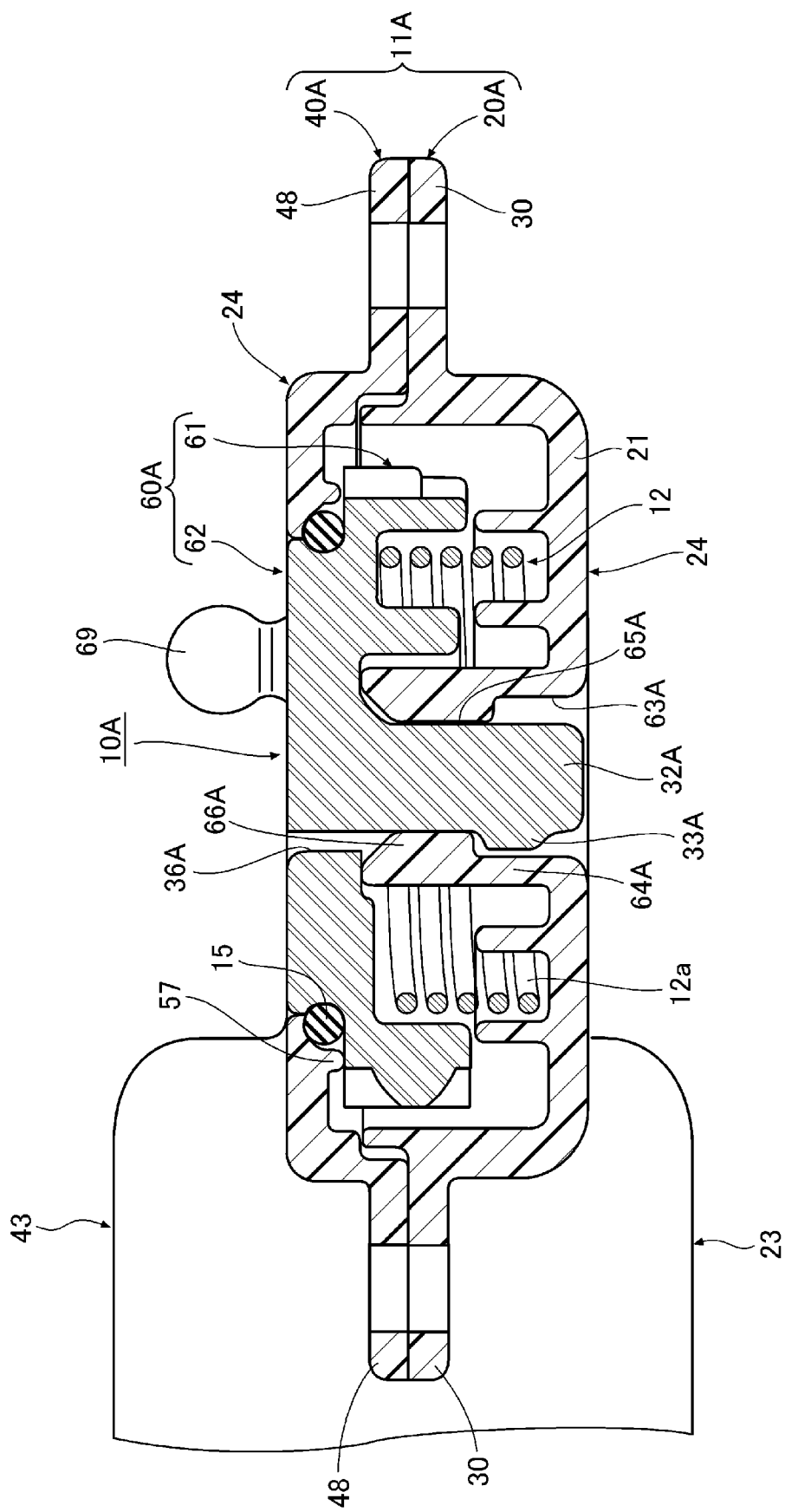
FIG. 25 is a sectional view taken along a line E-E indicated by arrows in FIG. 24.
Figure 26:
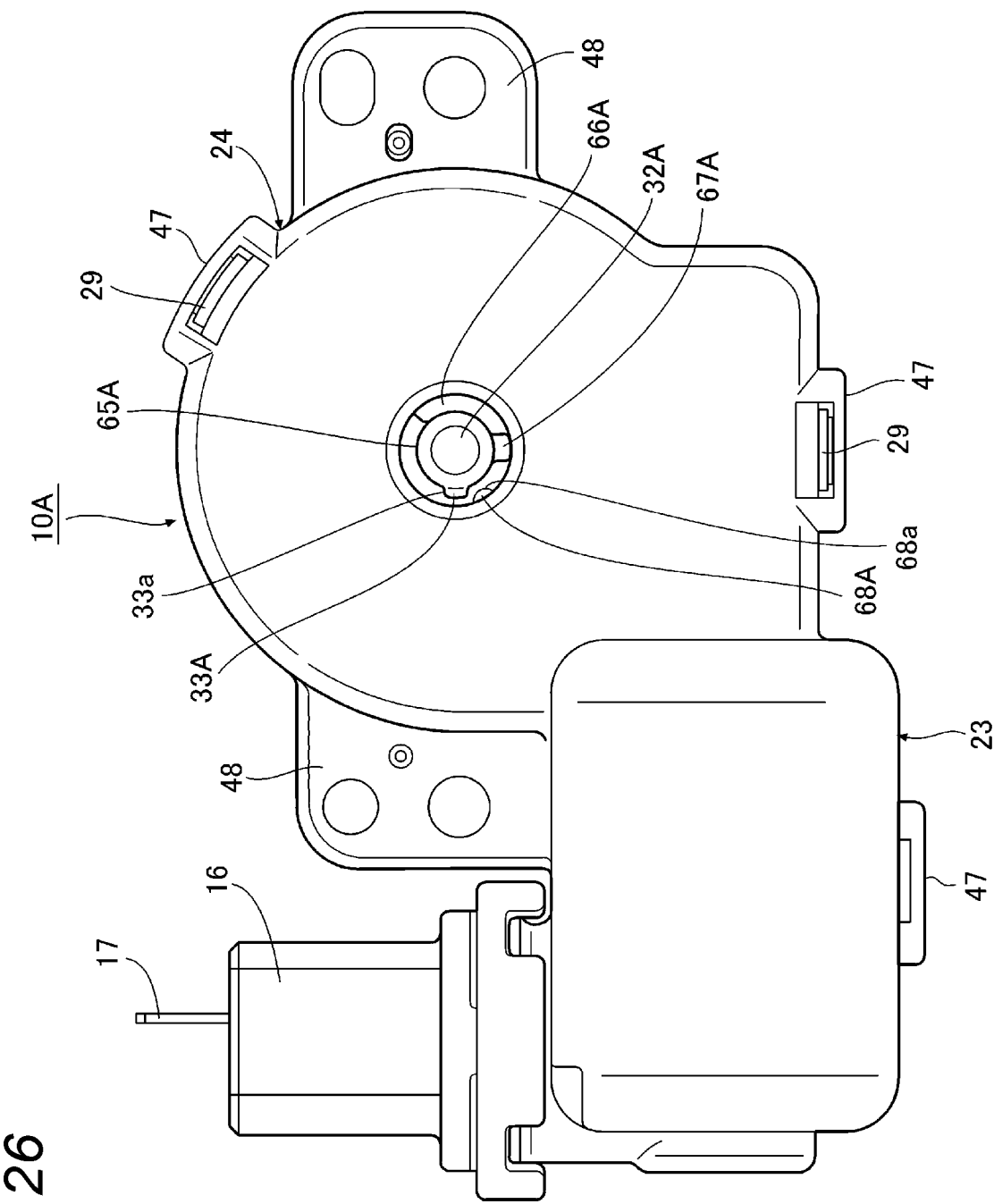
FIG. 26 is a bottom view of the same lock device.

Another embodiment of a lock device for an opening and closing body according to the present invention is shown in FIGS. 24 to 26. Same reference sings will be given to portions which are substantially like to those of the embodiment that has been described above, and the description thereof will be omitted here.

A lock device 10A for an opening and closing body (hereinafter, also referred to simply as a "lock device 10A") according to this embodiment is constructed such that a pivot 32A is provided on a rotation body 60A, a support hole 65A is provided in a first case 20, and the rotation body 60A is rotatably supported on the first case 20A.

Specifically, as shown in FIG. 25, the pivot 32A protrudes from a center on a rear side of a rotational portion 62 of the rotation body 60A, and a first protruding portion 33A is provided at a portion on an outer circumference of a distal end portion of the pivot 32A in an axial direction thereof. In addition, a protruding portion forming hole 36A for forming the first protruding portion 33A is formed in the rotational portion 62 (refer to FIG. 24).

On the other hand, a shaft hole 63A is formed in a bottom wall 21 of the first case 20A in a position matching the pivot 32A, and a cylindrical portion 64A protrudes from a circumferential edge of a front side of the shaft hole 63A. An inner protruding portion 66A, in which a cut-out 67A (refer to FIG. 26) is provided, protrudes from an inner side of a distal end portion of the cylindrical portion 64A in a protruding direction thereof, and an inner portion thereof constitutes the support hole 65A. In addition, as shown in FIG. 26, a second protruding portion 68A is provided on a circumferential edge of the support hole 65A.

Then, in this embodiment, the pivot 32A is inserted into the support hole 65A with the first protruding portion 33A of the pivot 32A aligned with the cut-out 67A in the rotation body 60A, and then, the first protruding portion 33A is caused to pass through the cut-out 67A, then the rotation body 60 is caused to rotate in a second direction against a rotational biasing force of a biasing means, whereby not only is the rotation body 60A retained and held relative to the first case 20A by a retaining portion, but also the rotation body 60A is locked temporarily relative to the first case 20A as a result of both engaging surfaces 33a, 68a of a temporary locking portion being brought into engagement with each other. Then, when a second case 40A is assembled to the first case 20A in this state, the rotation body 60A is caused to rotate by a cam means, then an elastic member 90 comes into engagement with the rotation body 60A, whereby the rotation body 60A is held relative to the first case 20A with the first engaging surface 33a and the second engaging surface 68a disengaged from each other (refer to FIG. 26). As a result, both the engaging surfaces 33a, 68a of the temporary locking portion are restricted from being brought into engagement with each other, whereby striking noise can be reduced which is generated when both the engaging surfaces 33a, 68a are brought into engagement with each other.

Also, in this embodiment, when the rotation body 60A is pivotally supported in a case 11 so as to be rotatable, the protruding portion forming hole 36A formed in the rotation body 60A is closed by an end surface of the cylindrical portion 64A provided on the first case 20A as shown in FIG. 24, as a result of which striking noise generated inside the case can be further suppressed from releasing to the outside of the case.

The present invention is not limited to the embodiments that have been described heretofore, and various types of modified embodiments can be made thereto without departing from the spirit of the present invention, and resulting embodiments are also included in the scope of the present invention.

REFERENCE SIGNS LIST

1 Fixed body
2 Opening portion
3 Locking portion
5 Opening and closing body
10, 10A Lock device for opening and closing body (Lock device)
11 Case
12 Torsion spring
13 Motor
14 Worm
20, 20A First case
32, 32A Pivot
33, 33A First protruding portion
33a First engaging surface
36, 36A Protruding portion forming hole
40, 40A Second case
51 Support portion
53 Tapered surface
60, 60A Rotation body
64, 64A Cylindrical portion
65, 65A Support hole
68, 68A Second protruding portion
68a Second engaging surface 80, 81 Locking member
82 Engaging portion
90 Elastic member

The invention claimed is:

1. A lock device for an opening and closing body to be attached to an opening portion in a fixed body in such a manner as to be opened and closed, comprising:
   a locking portion to be provided on one of the fixed body and the opening and closing body;
   a locking member to be disposed on other of the fixed body and the opening and closing body and configured to engage with and disengage from the locking portion;
   a case including a first case and a second case configured to be assembled to the first case, and configured to be attached to the fixed body or the opening and closing body;
   a rotation body pivotally supported on the case so as to be rotatable; and
   a biasing means configured to rotationally bias the rotation body in a first direction,
   wherein a pivot is provided on one of the first case and the rotation body, and a support hole through which the pivot is passed is provided in other of the first case and the rotation body,
   wherein a cut-out is provided in a circumferential edge of the support hole, and a retaining portion is provided on the pivot, the retaining portion comprising a protruding portion configured to pass through the cut-out and being configured to retain the rotation body relative to the first case by causing the protruding portion to pass through the cut-out and thereafter allowing the rotation body to rotate in a second direction which is opposite to the first direction,
   wherein a first engaging surface and a second engaging surface are formed between the first case and the rotation body in such a manner as to engage with or disengage from each other in association with a rotation of the rotation body,
   wherein the first engaging surface and the second engaging surface are configured to engage with each other to form a temporary locking portion for temporarily locking the rotation body relative to the first case by restricting the rotation body from rotating in the first direction,
   wherein a cam means and a stopper are provided between the second case and the rotation body, the cam means being configured to allow the rotation body to rotate by a predetermined angle in the second direction so as to allow the first engaging surface and the second engaging surface, which are in an engaged state, to disengage from each other when the second case is assembled to the first case, the stopper being configured to engage with the rotation body after the rotation body is allowed to rotate by the cam means so as to hold the rotation body relative to the first case with the first engagement surface and the second engaging surface disengaged from each other, and
   wherein the first engaging surface and the second engaging surface are allowed to ride over each other.

2. The lock device for the opening and closing body according to claim 1,
   wherein a support portion protrudes from the second case, and
   wherein the cam means is formed at distal end side of the support portion, and the stopper is provided at a proximal end side of the support portion.

3. A lock device for an opening and closing body to be attached to an opening portion in a fixed body in such a manner as to be opened and closed, comprising:
   a locking portion to be provided on one of the fixed body and the opening and closing body;
   a locking member to be disposed on other of the fixed body and the opening and closing body and configured to engage with and disengage from the locking portion;
   a case including a first case and a second case configured to be assembled to the first case, and configured to be attached to the fixed body or the opening and closing body;
   a rotation body pivotally supported on the case so as to be rotatable; and
   a biasing means configured to rotationally bias the rotation body in a first direction,
   wherein a pivot is provided on one of the first case and the rotation body, and a support hole through which the pivot is passed is provided in other of the first case and the rotation body,
   wherein a cut-out is provided in a circumferential edge of the support hole, and a retaining portion is provided on the pivot, the retaining portion comprising a protruding portion configured to pass through the cut-out and being configured to retain the rotation body relative to the first case by causing the protruding portion to pass through the cut-out and thereafter allowing the rotation body to rotate in a second direction which is opposite to the first direction,
   wherein a first engaging surface and a second engaging surface are formed between the first case and the rotation body in such a manner as to engage with or disengage from each other in association with a rotation of the rotation body, wherein the first engaging surface and the second engaging surface are configured to engage with each other to form a temporary locking portion for temporarily locking the rotation body relative to the first case by restricting the rotation body from rotating in the first direction,
   wherein a cam means and a stopper are provided between the second case and the rotation body, the cam means being configured to allow the rotation body to rotate by a predetermined angle in the second direction so as to allow the first engaging surface and the second engaging surface, which are in an engaged state, to disengage from each other when the second case is assembled to the first case, the stopper being configured to engage with the rotation body after the rotation body is allowed to rotate by the cam means so as to hold the rotation body relative to the first case with the first engagement surface and the second engaging surface disengaged from each other,
   wherein a first protruding portion including the first engaging surface provided thereon is provided on an outer circumference of the pivot, and a second protruding portion including the second engaging surface provided thereon is provided on a circumferential edge of the support hole,
   wherein the first protruding portion and the second protruding portion are configured to ride over each other against a rotational biasing force of the biasing means by being caused to deviate from each other via a gap formed between the pivot and the support hole, and
   wherein the second engaging surface of the second protruding portion of the support hole is brought into engagement with the first engaging surface of the first protruding portion of the pivot for temporary locking as a result of the biasing force of the biasing means applied also in a direction in which the first protruding portion and the second protruding portion are brought into engagement with each other after the first protruding portion and the second protruding portion ride over each other.

4. A lock device for an opening and closing body to be attached to an opening portion in a fixed body in such a manner as to be opened and closed, comprising:
- a locking portion to be provided on one of the fixed body and the opening and closing body;
- a locking member to be disposed on other of the fixed body and the opening and closing body and configured to engage with and disengage from the locking portion;
- a case including a first case and a second case configured to be assembled to the first case, and configured to be attached to the fixed body or the opening and closing body;
- a rotation body pivotally supported on the case so as to be rotatable; and
- a biasing means configured to rotationally bias the rotation body in a first direction,
- wherein a pivot is provided on one of the first case and the rotation body, and a support hole through which the pivot is passed is provided in other of the first case and the rotation body,
- wherein a cut-out is provided in a circumferential edge of the support hole, and a retaining portion is provided on the pivot, the retaining portion comprising a protruding portion configured to pass through the cut-out and being configured to retain the rotation body relative to the first case by causing the protruding portion to pass through the cut-out and thereafter allowing the rotation body to rotate in a second direction which is opposite to the first direction,
- wherein a first engaging surface and a second engaging surface are formed between the first case and the rotation body in such a manner as to engage with or disengage from each other in association with a rotation of the rotation body,
- wherein the first engaging surface and the second engaging surface are configured to engage with each other to form a temporary locking portion for temporarily locking the rotation body relative to the first case by restricting the rotation body from rotating in the first direction,
- wherein a cam means and a stopper are provided between the second case and the rotation body, the cam means being configured to allow the rotation body to rotate by a predetermined angle in the second direction so as to allow the first engaging surface and the second engaging surface, which are in an engaged state, to disengage from each other when the second case is assembled to the first case, the stopper being configured to engage with the rotation body after the rotation body is allowed to rotate by the cam means so as to hold the rotation body relative to the first case with the first engagement surface and the second engaging surface disengaged from each other,
- wherein the pivot protrudes integrally from the first case,
- wherein a cylindrical portion into which the pivot is inserted is provided on the rotation body,
- wherein a first protruding portion including the first engaging surface provided thereon is provided on the outer circumference of the pivot, a second protruding portion including the second engaging surface provided thereon is provided on the circumferential edge of the support hole, and a hole for forming the first protruding portion is formed in the first case, and
- wherein an end surface of the cylindrical portion is configured to close the hole when the rotation body is pivotally supported on the case so as to be rotatable.

* * * * *